(12) United States Patent
Liang et al.

(10) Patent No.: US 11,556,897 B2
(45) Date of Patent: Jan. 17, 2023

(54) JOB-POST BUDGET RECOMMENDATION BASED ON PERFORMANCE

(71) Applicant: Microsoft Technology Licensing, LLC, Redmond, WA (US)

(72) Inventors: Keqing Liang, Sunnyvale, CA (US); Sumedha Swamy, San Jose, CA (US); Qianqi Shen, Saratoga, CA (US); Qing Duan, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/900,708

(22) Filed: Jun. 12, 2020

(65) Prior Publication Data

US 2020/0302400 A1   Sep. 24, 2020

Related U.S. Application Data

(63) Continuation-in-part of application No. 15/994,998, filed on May 31, 2018, now abandoned.

(51) Int. Cl.
*G06Q 10/10* (2012.01)
*G06Q 30/02* (2012.01)

(52) U.S. Cl.
CPC ..... *G06Q 10/1053* (2013.01); *G06Q 30/0273* (2013.01); *G06Q 30/0277* (2013.01)

(58) Field of Classification Search
CPC ......... G06Q 10/1053; G06Q 10/06315; G06Q 30/02; G06Q 30/0206; G06Q 30/0213;
(Continued)

(56) References Cited

U.S. PATENT DOCUMENTS 8,732,015 B1 *  5/2014  Beckerman ........ G06Q 30/0273
                                                      705/14.46
10,366,111 B1   7/2019  Florissi et al.
(Continued)

OTHER PUBLICATIONS

Arnoud V. den Boer et al., "Simultaneously Learning and Optimizing Using Controlled Variance Pricing", Dec. 10, 2013, Management Science, 60(3), 770-783, https://doi.org/10.1287/mnsc.2013.1788 (Year: 2013).*

(Continued)

*Primary Examiner* — Lynda Jasmin
*Assistant Examiner* — Joshua D Schneider
(74) *Attorney, Agent, or Firm* — Schwegman Lundberg & Woessner, P.A.

(57) ABSTRACT

Methods, systems, and computer programs are presented for presenting return-on-investment (ROI) information, for budgeted services that resulted in a successful service delivery, on a user interface for setting the budget for a service request. One method includes an operation for identifying daily budgets for budgeted services that resulted in a successful service delivery (BSSSD). Each daily budget indicates an amount for spending in promotion of the BSSSD in an online service. The method further includes receiving a request, in a graphical user interface (GUI) of the online service, for posting a daily budget for a first budgeted service. Further, a performance value, associated with the daily budgets of the BSSSD that are similar to the first budgeted service, is selected. Further, the method includes causing presentation, by the one or more processors, of the performance value in the GUI.

20 Claims, 20 Drawing Sheets

COMMITTED BOOKING ESTIMATION

(58) Field of Classification Search
CPC ........... G06Q 30/0251; G06Q 30/0272; G06Q 30/0273; G06N 20/00
USPC .......................................................... 705/321
See application file for complete search history.

(56) References Cited

U.S. PATENT DOCUMENTS

| | | |
|---|---|---|
| 2010/0093379 A1 | 4/2010 | Neely et al. |
| 2012/0323928 A1 | 12/2012 | Bhatia |
| 2013/0232173 A1 | 9/2013 | Maruyama et al. |
| 2014/0280363 A1 | 9/2014 | Heng et al. |
| 2015/0006414 A1* | 1/2015 | Janapareddy ...... G06Q 10/1053 705/319 |
| 2015/0032725 A1 | 1/2015 | Barykin et al. |
| 2015/0178811 A1* | 6/2015 | Chen ................. G06Q 30/0631 705/26.7 |
| 2015/0213485 A1* | 7/2015 | Wang ................. G06Q 30/0273 705/14.45 |
| 2015/0220976 A1* | 8/2015 | Guo .................. G06Q 30/0273 705/14.48 |
| 2015/0379429 A1* | 12/2015 | Lee ........................ G06N 20/00 706/11 |
| 2017/0060924 A1 | 3/2017 | Fitzhardinge |
| 2017/0358000 A1* | 12/2017 | Jain .................... G06Q 30/0249 |
| 2017/0371947 A1 | 12/2017 | Golander et al. |
| 2018/0014167 A1 | 1/2018 | Rubinstein |
| 2018/0034755 A1 | 2/2018 | Saoji et al. |
| 2018/0083898 A1 | 3/2018 | Pham |
| 2018/0083901 A1 | 3/2018 | McGregor et al. |
| 2018/0089588 A1 | 3/2018 | Ravi et al. |
| 2018/0233132 A1 | 8/2018 | Herold et al. |
| 2018/0268010 A1 | 9/2018 | Park et al. |
| 2019/0043017 A1* | 2/2019 | Grover .................. G06F 16/248 |
| 2019/0057404 A1* | 2/2019 | Deng ................. G06Q 30/0202 |
| 2019/0066200 A1* | 2/2019 | Deagan .................. G06Q 30/08 |
| 2019/0102695 A1* | 4/2019 | Biswas ................ G06F 13/102 |
| 2019/0370752 A1 | 12/2019 | Liang et al. |
| 2020/0004825 A1 | 1/2020 | Pastemack et al. |
| 2021/0312126 A1 | 10/2021 | Pastemack et al. |

OTHER PUBLICATIONS

"Non Final Office Action Issued in U.S. Appl. No. 15/994,998", dated Jul. 23, 2020, 23 Pages.

Boer, et al., "Simultaneously Learning and Optimizing Using Controlled Variance Pricing", In Journal of Management Science, vol. 60, Issue 3, Mar. 2014, pp. 770-783.

"International Search Report and Written Opinion Issued in PCT Application No. PCT/US19/032552", dated Aug. 16, 2019, 12 Pages.

"Non Final Office Action Issued in U.S. Appl. No. 16/020,148", dated Nov. 24, 2020, 19 Pages.

* cited by examiner

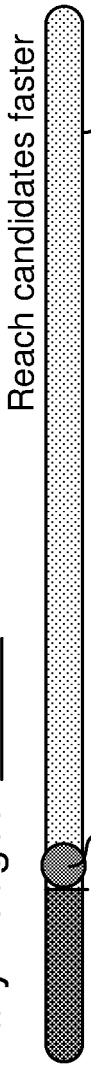

Step 3: Set your budget, pay when candidates view your job

Daily Budget $22

Office Manager
Corporation C
San Jose, California

Reach candidates faster

Job posts like yours

The typical daily budget for similar jobs that got confirmed hires is:

$20.00 - $25.00

Among jobs with confirmed hires, 50% posted their budget within or above this range To reach enough candidates for this job post, we recommend $22.00 or more for your daily budget Keep my job open until [I close it ▶]

Your job will stay open until you close it.

Actual daily spend may be up to 30% higher than your $38 daily budget when your job post has the opportunity to get more views

[Back]   [Preview]   [Proceed to checkout]

JOB-POST BUDGET RECOMMENDATION BASED ON PERFORMANCE

CLAIM OF PRIORITY

This application is a Continuation-in-part Application of U.S. patent application Ser. No. 15/994,998, entitled "Determination of Job-Post Budget Recommendation," filed on May 31, 2018, and is herein incorporated by reference in its entirety.

TECHNICAL FIELD

The subject matter disclosed herein generally relates to methods, systems, and programs for analyzing data to provide user recommendations for setting a budget for a predetermine period for a recurring service.

BACKGROUND

When a recruiter posts a job on a website (e.g., jobs bulletin board, social network, or jobs website), the recruiter has to decide how much money to spend in order to gain enough visibility to good prospective candidates. Several variables affect the effectiveness of the job post, such as the size of the pool of potential candidates, competition for hiring for a given job title, geographic location of the job, job salary, etc. Therefore, it may be difficult for every corporate recruiter, who may be dealing with hundreds of different jobs, to come up with a reasonable amount to spend on the job post to get the desired results.

In some cases, the jobs website may provide a recommendation to the recruiter. However, the recommendation may be too high, which may cause the recruiter to skip posting the job, or the recommendation may be too low, which may result in poor performance for the job post and a missed opportunity for revenue for the jobs website.

Often, the recruiter would like to know how much budget is being set by other people posting similar jobs, and how effective the budgets are for actually getting people hired for the job.

Further, the same problem may arise when dealing with other services that require a budget, and the selected budget affects the performance of the service. Other examples for setting budgets include setting a budget for advertising, boosting a website in the results of a search engine, placing sponsored content on a user feed, etc.

BRIEF DESCRIPTION OF THE DRAWINGS

Various ones of the appended drawings merely illustrate example embodiments of the present disclosure and cannot be considered as limiting its scope.

FIG. 1B shows a user interface for posting a job opening with information about budgets for similar jobs with confirmed hires, according to some example embodiments.

DETAILED DESCRIPTION

Figure 1A:
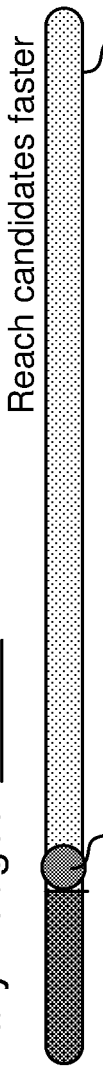
FIG. 1A shows a user interface for posting a job opening, according to some example embodiments.

Example methods, systems, and computer programs are directed to presenting return-on-investment (ROI) information, for jobs with confirmed hires, on a user interface for setting the budget for promoting a job post. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The different elements that affect performance of job posts are broken down into individual models, which are then executed to identify the impact of each of the elements. In some aspects, the recommended daily budget is analyzed to determine the optimum daily budget to recommend based on the behavior of the different elements. The result is improved job-post performance and potentially an increase in the daily budget committed by the job poster.

In some implementations, an experiment is performed using random suggested budgets, and the performance of the job posts in the experiment is measured. Additionally, two or more models are defined to optimize the performance of the recommended daily budget when posting a job. The first model tracks the conversion rate for posting jobs when a recruiter visits the job posting webpage, and the second model tracks the behavior of the daily budget selected by the recruiter. The two models are then combined to optimize the committed bookings for the job posts.

In one embodiment, a method is provided. The method includes operations for performing a test to determine responses of users to recommended daily budgets for budgeted-service requests. The recommended daily budgets are based on a multiplier for an initial budget value for the budgeted-service requests. Further, the method includes building a model to determine expected revenue as a function of the multiplier, and determining, based on the model, a value of the multiplier that maximizes the expected revenue. Additionally, the method includes operations for detecting a request from a user for adding a first budgeted service, and for setting the initial budget value for the first budgeted service based the value of the multiplier that maximizes the expected revenue. The initial budget value for the first budgeted service is presented in a user interface.

In another embodiment, a system includes a memory comprising instructions and one or more computer processors. The instructions, when executed by the one or more computer processors, cause the one or more computer processors to perform operations comprising: identifying an initial budget value for recommending a daily budget when a job poster is adding a job post; performing a test to determine responses of job posters when the recommended daily budget is presented as a function of a multiplier applied to the initial budget value; defining a model to determine committed bookings as a function of the multiplier; determining, based on the model, a value of the multiplier that maximizes the committed bookings; setting a new initial budget value to the initial budget value times the value of the multiplier that maximizes the committed bookings; and causing presentation, in a user interface, of the new initial budget value when job posters add new job posts. It is noted that committed bookings are maximized with constrains on the order conversion rate drop and the cost per application increase.

In yet another embodiment, a machine-readable storage medium (e.g., a non-transitory storage medium) includes instructions that, when executed by a machine, cause the machine to perform operations comprising: identifying an initial budget value for recommending a daily budget when a job poster is adding a job post; performing a test to determine responses of job posters when the recommended daily budget is presented as a function of a multiplier applied to the initial budget value; defining a model to determine committed bookings as a function of the multiplier; determining, based on the model, a value of the multiplier that maximizes the committed bookings; setting a new initial budget value to the initial budget value times the value of the multiplier that maximizes the committed bookings; and causing presentation, in a user interface, of the new initial budget value when job posters add new job posts.

In one aspect, comparison information is presented about budgets used by similar jobs that have resulted in confirmed hires in the past. The system analyzes data on job posts that resulted in confirmed hires to determine statistical classifications for the results. The system then selects one or more messages to convey the recruiter information on past use of budgets in an easy-to-understand format. In some cases, the information is presented when the recruiter is setting the daily budget for spending on promotion for the job post.

For example, a message presented is, "Job posts like yours with confirmed hires have set $20-25 as the typical daily budget. Among jobs with confirmed hires, 50% post their budget within or above this range."

One general aspect includes a method that includes an operation for identifying daily budgets for budgeted services that resulted in a successful service delivery (BSSSD). Each daily budget indicates an amount for spending in promotion of the BSSSD in an online service. The method further includes receiving a request, in a graphical user interface (GUI) of the online service, for posting a daily budget for a first budgeted service. Further, a performance value, associated with the daily budgets of the BSSSD that are similar to the first budgeted service, is selected. Further, the method includes causing presentation, by the one or more processors, of the performance value in the GUI.

It is noted that embodiments are presented with reference to presenting job posts to users, but the same principles may be used for any service where the user has to set a budget for promoting content in a competitive environment, where the higher the budget, the higher probability of having the desired content reach the best recipients for the content, or to maximize exposure to a large audience. These services are referred to herein as budgeted services. Besides job postings, other examples of budgeted services include setting a budget for promoting results obtained by a search engine (e.g., to list a company's website higher in the results or to list it as sponsored content), a budget for advertising in online media (e.g., user feed, search results, news media, games), and so forth.

FIG. 1A illustrates a user interface 102 for posting a job opening, according to some example embodiments. In some implementations, when a job poster enters a job opening, the job poster enters information about the desired candidate, such as title, education, years of experience, salary range, geographic location, etc. Additionally, the job poster may select how much to spend to present this job post to the potential candidates. In general, the higher the budget, the higher the number of candidates that the job posts will reach, thereby increasing the possibilities of hiring a good candidate.

In some example embodiments, if the user selects an option to set the daily budget of the job post, the user interface 102 is presented on a device being accessed by the job poster. The user interface 102 provides a short description of the job and an area 104 to set the budget. Further, a sliding bar 106 is provided to enter the daily budget, and the user can slide the marker 108 on the sliding bar 106 to increase or decrease the budget. If the user changes the daily budget using the sliding bar 106, the area 104 is updated automatically based on the change.

A recommendation is provided for the daily budget (e.g., $34) and is placed in the area 104. The job poster is able to modify the suggested daily budget to another number, which may be higher or lower than the recommended value.

In some example embodiments, a check box (not shown) is provided to set a maximum budget. If the user selects to set the maximum budget, a separate user interface is provided for entering the maximum budget, and the user will never spend an amount greater than the set maximum budget. If the user does not select a maximum budget, the system will aim at a daily spending that is about the amount specified in the daily budget for a preset period of time (e.g., 30 days), or until the job is closed by the job poster. The actual amount spent on a day may be less than the daily budget if the system is not able to identify enough candidates for that day.

It is to be noted that, in some implementations, the amount spent is based on the number of times the job is posted to a user, based on the number of clicks (e.g., selections) of the job post by candidates, or a combination thereof. In the example illustrated in FIG. 1A, the daily expenditures are based on the number of candidates who click on the job post, an option referred to as Pay Per Click (PPC).

If the system recommends a high daily budget, then it is possible to obtain a high income for the job post, as long as the user accepts the daily budget. On the other hand, a high daily budget may make the job poster reconsider this job post on this website because the price may be perceived as too high. In this case, the system may lose an income opportunity if the job poster does not place the order.

The conversion rate is the percentage of jobs posted in relationship to the number of job post requests that are initialized in the system, i.e., the number of jobs posted divided by the number of unique job posters that visited the job posting page. The difference between the number of initialized job post requests and the number of jobs posted is equal to the number of times that one job poster decides to quit the operation of adding a new job post. For example, if 100 unique job posters accessed the job post creation user interface and, from those 100 unique job posters, 60 job posts are created, the conversion rate is equal to 60%. The higher the conversion rate, the better for the jobs website because of the higher number of job posts created.

The total revenue may differ from the budget as the total revenue is based on the number of job views by potential candidates. Further, the total revenue for a given job post is correlated to the daily budget times the number of days the job post stays open (assuming that the daily budget is spent every day). In some implementations, the job poster may cancel the job post at any time.

Further, a preview button 112 and a proceed-to-checkout button 114 are selectable by the user to preview the job post and to continue with the process to place the job post after selecting the daily budget. Further, a multiple-choice field 110 is provided to select how long the job post will be placed with options to keep it until closed by the user or to specify a particular date.

FIG. 1B shows a user interface 118 for posting a job opening with information about budgets for similar jobs with confirmed hires, according to some example embodiments.

When a user increases the daily budget, the user has an expectation that the return on investment (ROI) will be bigger according to the increase. Typically, there is no information to give confidence to the user that by using a higher daily budget, the ROI will be higher. A user may have difficulty verifying the ROI of a budget, because if a user tries different budgets on different days, sometimes the user sees little or no difference regarding the impact of the different budgets (e.g., number of views or number of applicants).

The ROI may be measured as getting a qualified candidate that results in a confirmed hired. A confirmed hire is a person that has been hired after the job post has been placed. In some example embodiments, the social networking service analyzes the data from past job posts and then determines which job posts result in confirmed hires. For example, the social networking service tracks when users change jobs and the new jobs match the jobs that have been posted.

One way to provide information to a user regarding the ROI is to provide information about how similar job posts have performed in the past based on the daily budget. Giving the user data on the budget set by successful job posts will guide the user on how to set the daily budget. Box 116 provides information regarding confirmed hires, e.g., "Job posts like yours—The typical daily budget for similar jobs that got confirmed hires is: $20-$25. Among jobs with confirmed hires, 50% posted their budget within or above this range."

This message provides two things: a typical daily budget range, and a percentile of 50%. Other messages may use different percentiles or use a number instead of a range. For example, "Among jobs with confirmed hires, 80% used a minimum daily budget of $27."

This information will impact how the user sets the daily budget. For example, in a certain job post, if the average bidding price is slightly lower (e.g., $5.5) than the minimum daily budget ($6), then the budget for a job can be easily depleted. This especially matters for jobs that by nature should require higher bids, such as jobs of higher levels (executive or director level), or jobs that are in a competitive market segment (when there are more job openings than potential viewers). Further, a low minimum daily budget is not appropriate for bidders who are more serious and would want to increase their budget so as to increase their auction opportunities.

Figure 2:
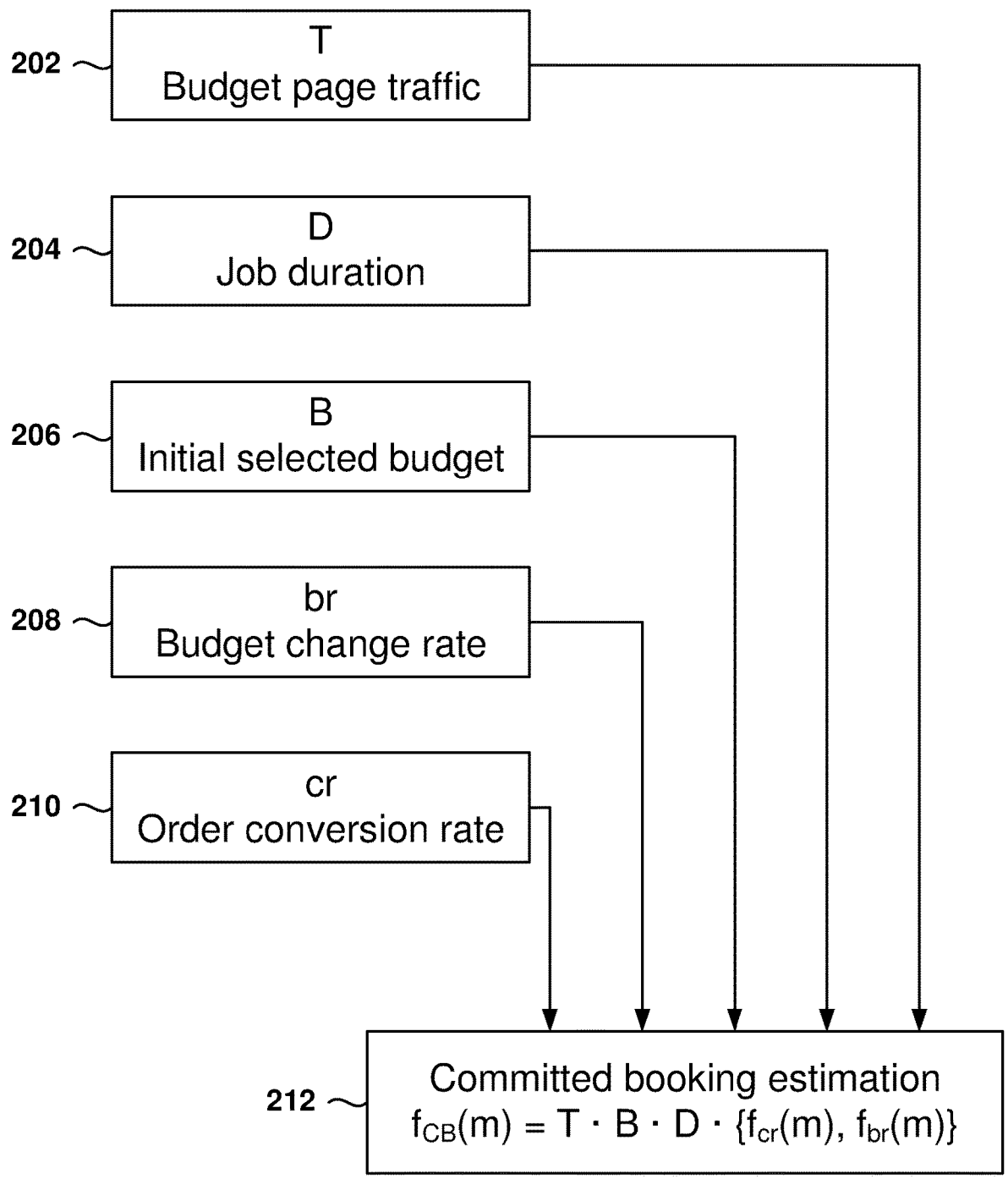
FIG. 2 illustrates the estimation of committed bookings, according to some example embodiments.

FIG. 2 illustrates the estimation of committed bookings, according to some example embodiments. One of the goals for the job-posting service is to optimize the recommended daily budget to maximize overall revenue. Another goal is to deliver an overall good service to users, so there is a tradeoff between optimized revenue and user satisfaction.

A measure related to revenue is committed bookings CB 212, which is the amount of revenue (e.g., bookings) obtained from all the posted jobs. The revenue obtained by the job-posting service depends directly on the CB: the higher the CB, the higher the revenue, so optimizing (e.g., maximizing) the CB means optimizing revenue.

CB depends on several factors, including budget page traffic T 202, a job duration D 204, an initial selected budget B 206 (e.g., the initial selected daily budget), a budget change rate br 208, and an order conversion rate cr 210. The budget page traffic T 202 is the number of visits to the daily budget page shown in the user interface 102 within a given period. For example, if job posters reached the daily budget page 1000 times within a year, then T is equal to 1000 for the year. Further, the job duration D 204 is the number of days that a job is posted, and the initial selected budget B 206 is a predefined parameter for recommending the daily budget. Thus, B may be set manually initially, but after the recommendation of the daily budget is optimized, B may change to a new value. Over time, periodic iterations may be performed to continue refining B.

Further, the budget change rate br 208 is a rate of change to be applied to B to obtain the recommended daily budget. For example, if br is 1.2, then the recommended daily budget will be br·B.

Thus, to estimate the committed bookings CB 212, these factors are multiplied together. Multiplying T by cr results in the number of job posts committed by the job posters. For example, if 500 job posters reach the daily budget page and 70% actually post jobs, the number of job posters is 350. Some job posters may post more than one job.

Further, if the recommended daily budget br·B is multiplied by D (e.g., the number of days the job post is open), the result is the income generated by an average job. If this income per job (br·B. D) is multiplied by the number of jobs posted (T·cr), then the result is the committed bookings CB 212. (br·B·D·T·cr).

In some example embodiments, the analysis for optimizing committed bookings is performed for each standardized job type. The job type may be defined by the title for the person being searched, and since some titles may be similar or related, the similar job titles are put together within the same category, the standardized job type.

As discussed below, AB testing is performed to experiment with different daily budget recommendations for each standardized job type. A random daily budget is selected as a recommendation for the job posts selected for the experiment. The random recommended daily budgets may be expressed as m. B, where m is a factor referred to as the multiplier. That is, the multiplier m is a factor applied to B to obtain a recommendation for a daily budget.

In some example embodiments, the random daily budget is selected within a range of possible values. For example, m is selected within the range between 0.75 and 2, but other ranges are also possible, such as between a lower range boundary a between 0.25 and 0.9, and an upper range boundary b between 1.1 and 5. Other values are also possible.

In some example embodiments, the distribution for m during the experiment is a uniform distribution; therefore, values for m between a and b are selected with equal probability.

Based on the experiment results, models are created based on the multiplier, one for cr and another one for br. In other embodiments, additional parameters may also be modeled as a function of m. Therefore, cr may be expressed as $f_{cr}(m)$, which is the function that predicts cr based on m, and br may be expressed as $f_{br}(m)$, which is the function that predicts br based on m.

Thus, the committed bookings CB 212 may be expressed as a function $f_{CB}(m)$, because two of the parameters are functions of m, as follows:

$$f_{CB}(m)=T \cdot B \cdot D \cdot f_{cr}(m) \cdot f_{br}(m) \qquad (1)$$

Figure 3:
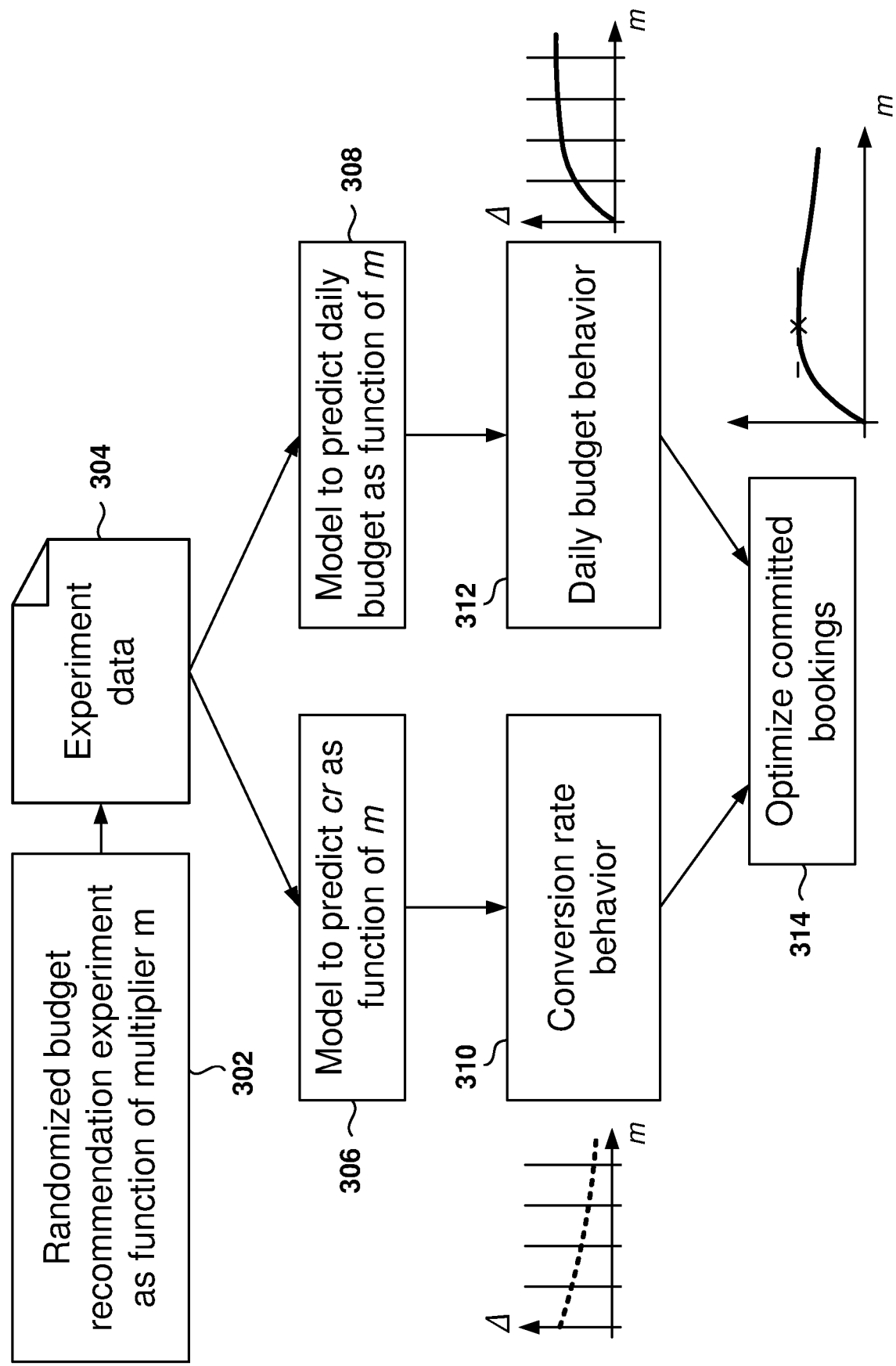
FIG. 3 illustrates the process for optimizing committed bookings based on experiment data, according to some example embodiments.

FIG. 3 illustrates the process for optimizing committed bookings based on experiment data, according to some example embodiments. It is known that some job posters are willing to pay a higher amount to increase the visibility of their job posts. This means that, if the suggested daily budget is increased, some customers will accept and increase their bookings. However, some customers may get discouraged and disregard the advice; these customers may quit posting the job because they feel that the price is too high or may enter a daily budget that is less than the recommended daily budget.

A multi-layered approach is used to test modeling for different parameters. Each parameter is modeled independently, so it is possible to fine-tune each of the parameters separately, which makes the system more flexible by offering independent and separate controls. In the example embodiment illustrated in FIG. 3, two different models are used, as described above. However, other embodiments may utilize additional models.

To collect data for the models, an experiment 302 is performed to determine the response of job posters to different daily budgets. As discussed above, the multiplier m is utilized as the variable for the experiment, and m determines the suggested daily budget. In one example embodiment, m has an upper bound and a lower bound with a uniform distribution. In other example embodiments, different distributions may be utilized, and the upper and lower bounds may be increased, decreased, or eliminated. For example, a Gaussian distribution may be used centered around B, but other possible distributions may be utilized.

The uniform distribution within defined boundaries around the existing suggested daily budget works well to fine-tune the model. It is to be noted that the model may be run multiple times with different data and different values of m, which results in a different value for the suggested daily budget. Therefore, if the value of the optimal suggested daily budget obtained in the experiment is outside the initially defined upper and lower bounds, the values of m and the lower and upper bounds are then adjusted for further experiments).

The experiment 302 utilizes a randomized daily budget recommendation where the variable is the multiplier m. During the experiment, job posters are offered different suggested daily budgets and their responses recorded to obtain experiment data 304. The data captured includes the value of m, identification of the job poster, job post data, cost per click, whether the job poster quit the job-posting process, etc. For example, if B is 10 and the recommended daily budget offered is 15, the job poster may accept the recommendation, enter a different daily budget (higher or lower than the suggested daily budget), or quit the process.

During one experiment, the average suggested daily budget was higher than the original B, and the results were an increase of about 15% in the daily budgets accepted by job posters, an increase of about 12% in committed bookings, and a 5% increase in total revenue, while the conversion rate decreased slightly by about 1.5%. Thus, the experiment showed that the new average suggested daily budget resulted in a 5% increase in revenue.

In some example embodiments, the number of possible different standardized job titles is rather high (e.g., around 40,000); therefore, the job titles may be placed in buckets in order to increase the amount of data available for each bucket.

At operation 306, a model is created to predict conversion rate cr based on the multiplier m. More details about implementation of the model utilizing a machine-learning program (MLP) are provided below with reference to FIG. 6. At operation 308, a second model is built to predict the daily budget based on the multiplier m. It is to be noted that the daily budget is equal to br(m)·B; therefore, the model for predicting the daily budget is equivalent to the model for predicting br (e.g., $f_{br}(m)$ as illustrated in FIG. 2) because B is a constant.

In some example embodiments, the first model for the conversion rate is a logistic-regression model, and the second model for the daily budget is a linear-regression model, but other embodiments may utilize other machine-learning programs.

The models are trained with the experiment data 304 based on job-related features and user-related features. Once the models are trained, the models can predict what the conversion rate cr and the daily budget will be when different values of m are selected.

At operation 310, the behavior of cr as a function of m is determined, which means determining the percentage of job posts created once a user reaches the page for selecting the daily budget. At operation 312, the daily budget behavior as a function of m is determined, which means predicting the daily budget for the different values of m. More details regarding cr and the daily budget are provided below with reference to FIG. 4.

At operation 314, the committed bookings are optimized based on cr and the daily budget as a function of m. This includes identifying the value of m that generates the maximum predicted committed bookings. As the suggested daily budget increases, the selected daily budget tends to increase, but on the other hand, cr tends to decrease. These two opposing forces are analyzed to determine the best value of m for the highest committed bookings. The result may be an m greater than 1, which means that higher daily budgets will outweigh the effect of the decrease in cr. If the best m for getting the highest committed bookings is less than 1, then it means that, although the daily budgets may be lower, an increase in cr will result in more job posts and higher committed bookings.

Figure 4:
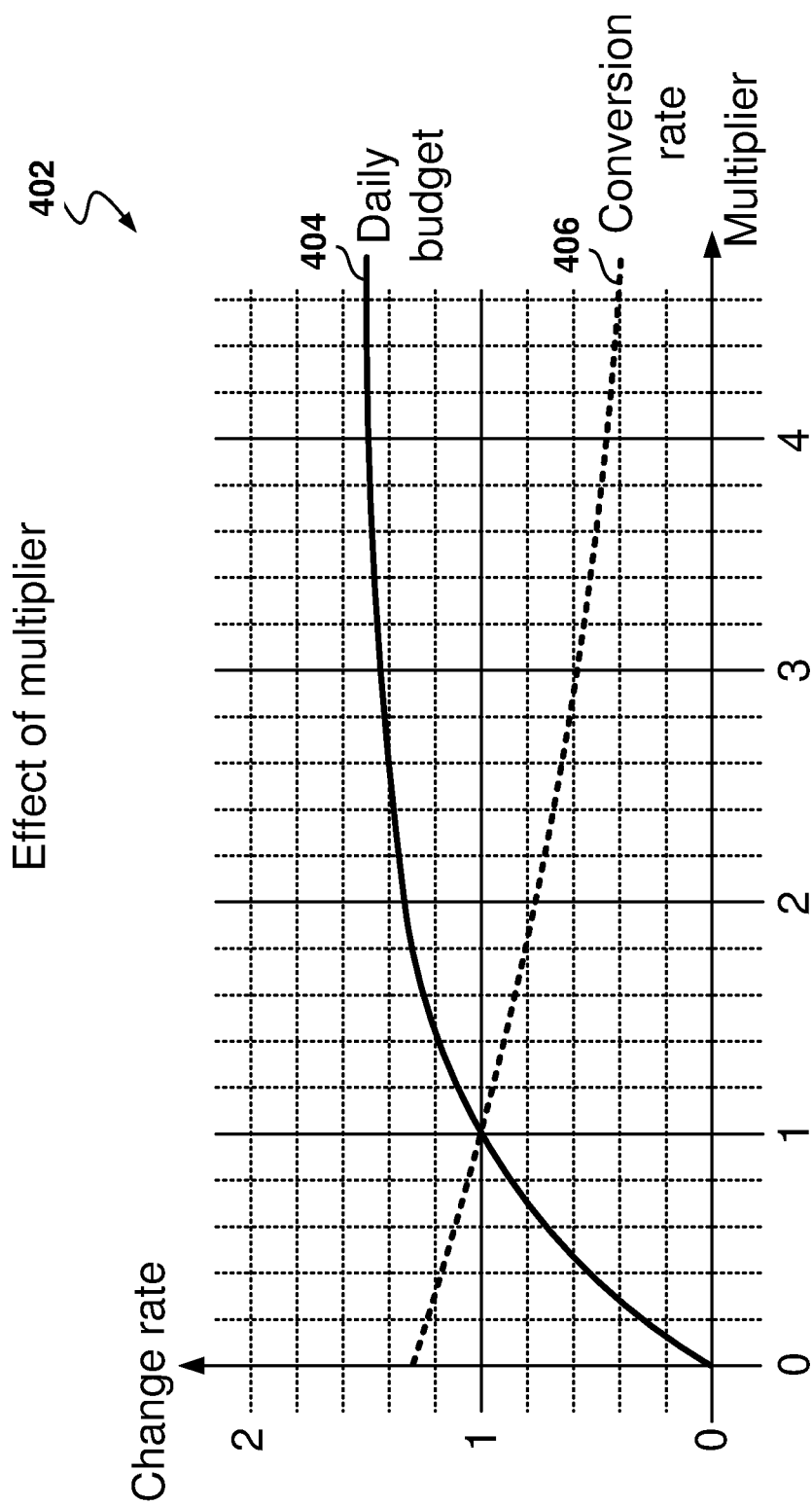
FIG. 4 is a chart showing the daily budget and the conversion rate as functions of the recommended budget multiplier, according to some example embodiments.

FIG. 4 is a chart 402 showing the daily budget and the conversion rate for a job post type as functions of the recommended budget multiplier, according to some example embodiments. The chart 402 includes a daily budget line 404 and a conversion rate line 406. The horizontal axis is for the multiplier m, and the vertical axis is for the change rate of the respective values.

As the multiplier grows (which means that the suggested daily budget grows), the daily budget for job posts grows and the conversion rate decreases. When the multiplier has a value of 1, it means that the suggested daily budget does not change and the change rate for the daily budget and the conversion rate also stays at 1.

The chart 402 shows the behavior of the opposing forces. The goal is to find the optimal volume for the committed bookings by combining the data from both lines 404 and 406.

Figure 5:
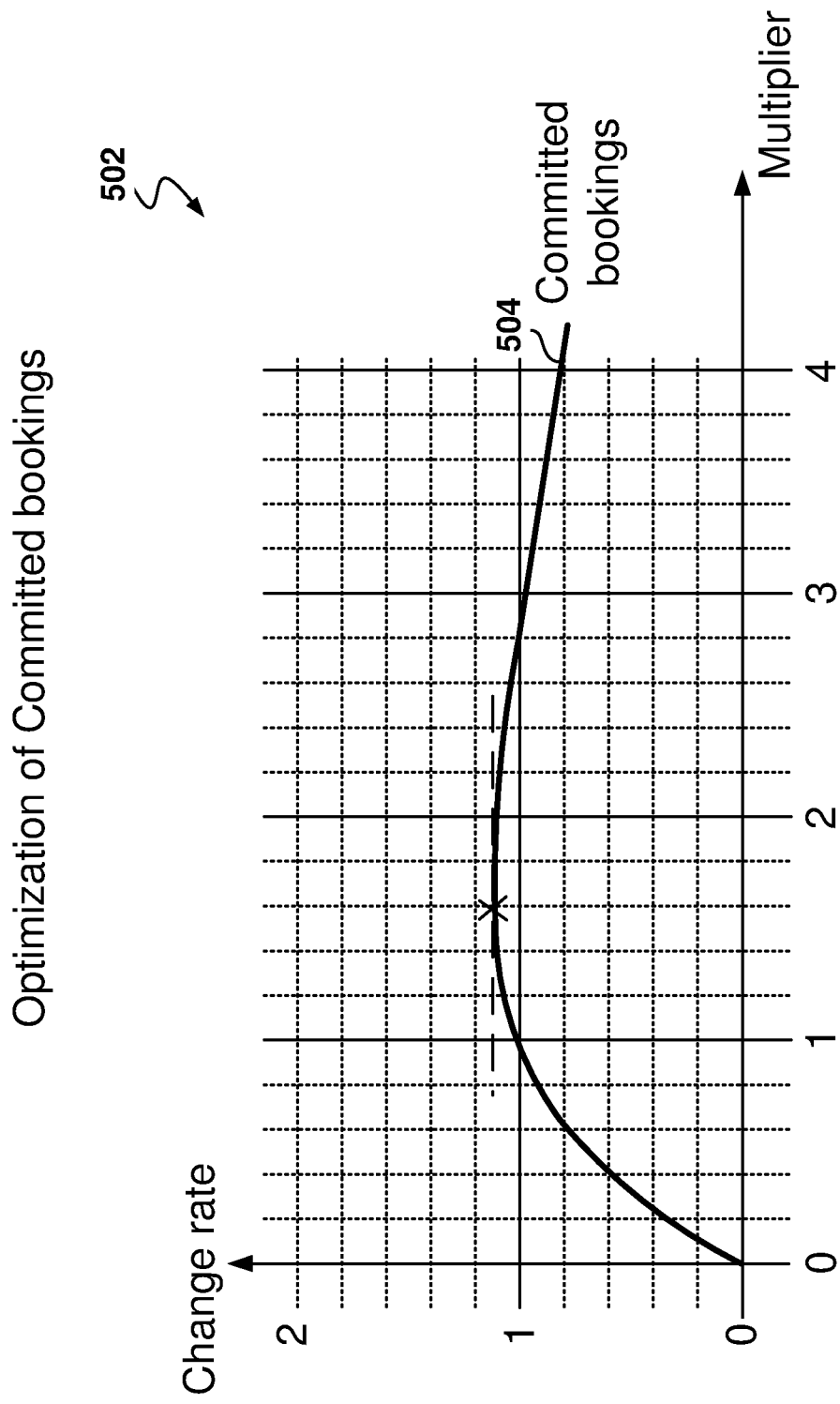
FIG. 5 is a chart showing the optimal committed bookings, according to some example embodiments.

FIG. 5 is a chart 502 showing the optimal committed bookings, according to some example embodiments. A committed-bookings line 504 illustrates an example of how the committed bookings change as a function of the multiplier m.

The data illustrated in FIG. 4 is combined to calculate the committed bookings by utilizing equation (1) as described above with reference to FIG. 2. Since one of the models is for the daily budget DB and DB is equal to br(m)·B, equation (1) may be expressed as follows:

$$f_{CB}(m) = T \cdot D \cdot f_{cr}(m) \cdot f_{DB}(m) \qquad (2)$$

Thus, equation (2) may be used to obtain the value of committed bookings based on the model for the conversion rate and the model for the daily budget. For each value of m, the value of committed bookings is calculated, and the change rate determined.

In the example illustrated in the chart 502, the maximum committed bookings corresponds to an m of about 1.6. In some example embodiments, the system adjusts the recommended daily budget by making br equal to the m that provides the maximum committed bookings (e.g., br equals 1.6 for this example). The new suggested daily budget B will be set to br·B, with br being the m that provides the maximum committed bookings. If the process, to perform experiments to optimize the value of m, is repeated over time, the value of B may be fine-tuned in response to changes in the system behavior to continue optimizing the committed bookings value. The computer system is configured to find matches to job applications for a limited amount of time set based upon a budget. This way, computer resources are used efficiently, and a user's budgetary concerns are satisfied.

Figure 6:
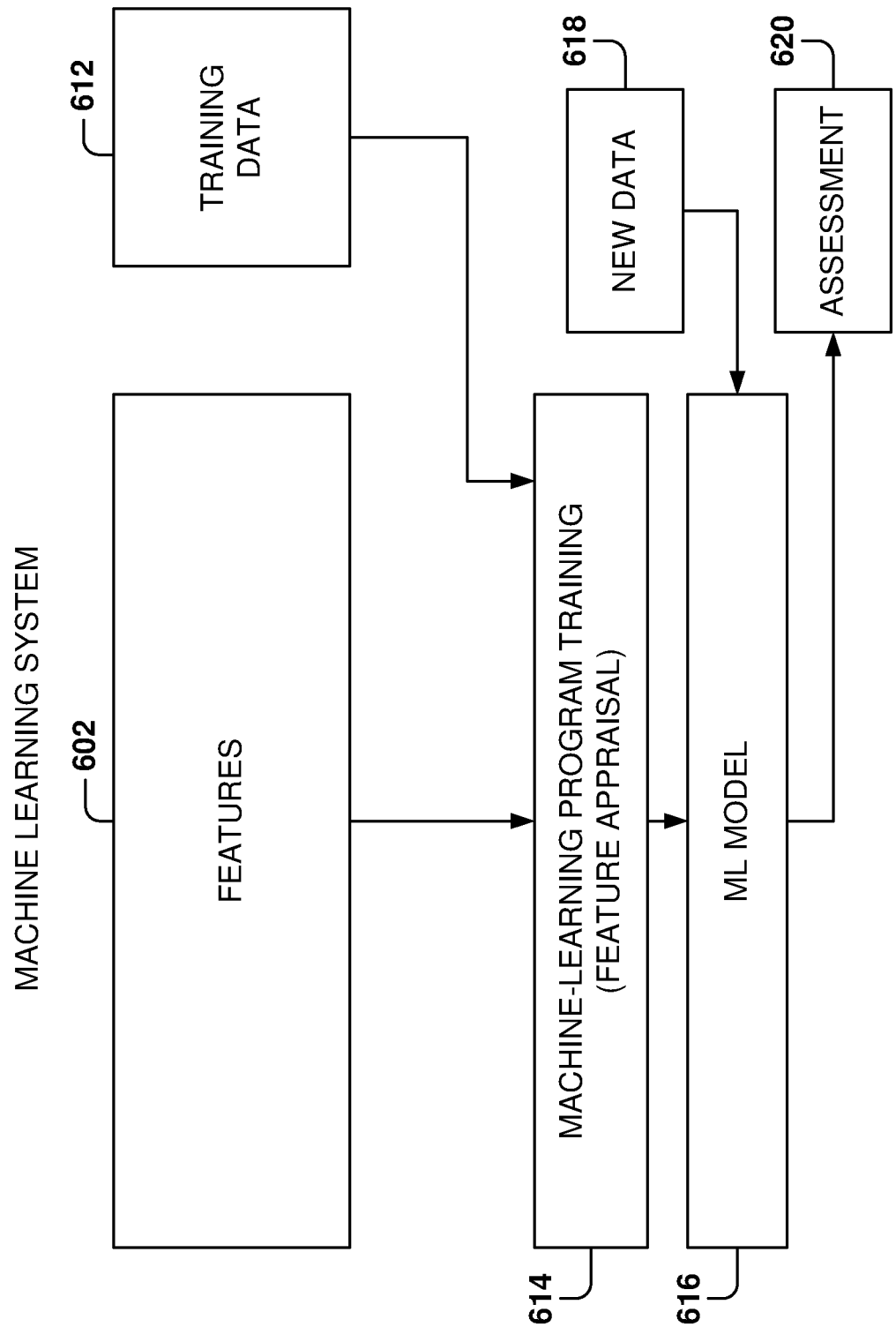
FIG. 6 illustrates the training and use of a machine-learning program, according to some example embodiments.

FIG. 6 illustrates the training and use of a machine-learning program, according to some example embodiments. In some example embodiments, machine-learning programs (MLPs), also referred to as machine-learning algorithms or tools, are utilized to obtain machine-learning (ML) models that estimate parameters associated with searches, such as job searches.

Machine learning is a field of study that gives computers the ability to learn without being explicitly programmed. The MLPs build a model 616 from example training data 612 in order to make data-driven predictions or decisions expressed as outputs or assessments 620. Although example embodiments are presented with respect to a few MLPs, the principles presented herein may be applied to other MLPs.

In some example embodiments, different MLPs. For example, linear regression, logistic regression, Naive-Bayes, Random Forest (RF), neural networks (NN), matrix factorization, and Support Vector Machines (SVM) tools may be used for analyzing job posts.

The machine-learning algorithms utilize features 602 for analyzing the data to generate assessments 620. A feature 602 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

To build the model, the MLPs utilize the training data 612 to find correlations among the identified features 602 that affect the outcome or assessment 620. In some example embodiments, the training data 612 includes labeled data, which is known data for one or more identified features 602 and one or more outcomes.

With the training data 612 and the identified features 602, the MLP is trained at operation 614. The MLP appraises the value of the features 602 as they correlate to the training data 612. The result of the training is the ML model 616.

When the model 616 is used to perform an assessment, new data 618 is provided as an input to the trained model 616, and the model 616 generates the assessment 620 as output. For example, a first model tracks the conversion rate for posting jobs when a recruiter visits the job posting webpage, and the second model tracks the behavior of the daily budget selected by the recruiter. The two models are then combined to optimize the committed bookings for the job posts.

In some example embodiments, the models created in operations 306 and 308 (FIG. 3) utilize the multiplier m as a feature and one or more features from a set of features. The set of features includes job-post features, job-poster features, social-network-profile features, company features, and response features.

The job-post features may include job identifier, job poster, company, recommended daily budget, whether the job poster posted the job after reaching the daily budget page, committed daily budget, job description, title description, title identifier, super-title, industry, location, region, salary range, desired skills, seniority, cost per acquisition (CPA), and amount of time the job post stays open.

The job-poster features may include job-poster type (new or repeat), number of jobs posted previously, jobs posted previously, average budget used previously, and conversion rate for the job poster.

The social-network-profile features may include data about users of the jobs website, including name, title, super-title, years of experience, skills, job posts presented to the user, job posts viewed by the user, education, experience, geographic location, and activities of the user in the social network.

The company features may include company identifier, company name, annual revenue, number of employees, industry, region, and number of jobs posted within a predetermined period (e.g., within last 12 months, last year).

The response features may include recommended daily budget, submitted daily budget, difference between the recommended daily budget and the submitted daily budget, recommended total budget, submitted total budget, actual total budget spent while the job post is open, cost per click, number of times the job post is presented to candidates, and number of clicks on the job post.

Figure 7:
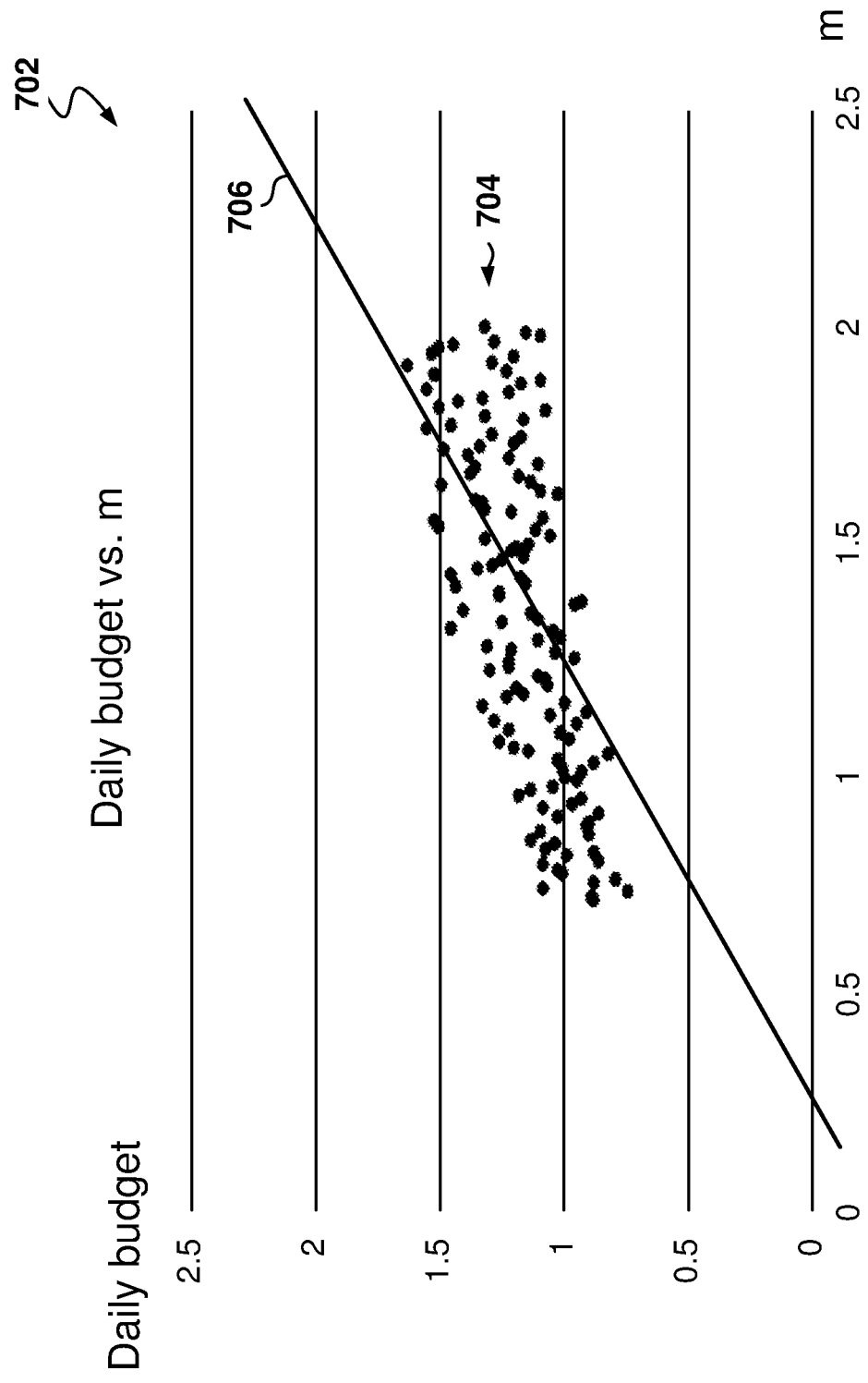
FIG. 7 is a chart showing the calculation of the linear regression model for the daily budget, according to some example embodiments.

FIG. 7 is a chart 702 showing the calculation of the linear regression model for the daily budget, according to some example embodiments. The chart 702 illustrates a plurality of daily-budget observations 704 during the experiments for multiple values of m (horizontal axis). As a result of the linear regression, a line 706 is determined to predict how the daily budget varies as a function of m.

Figure 8:
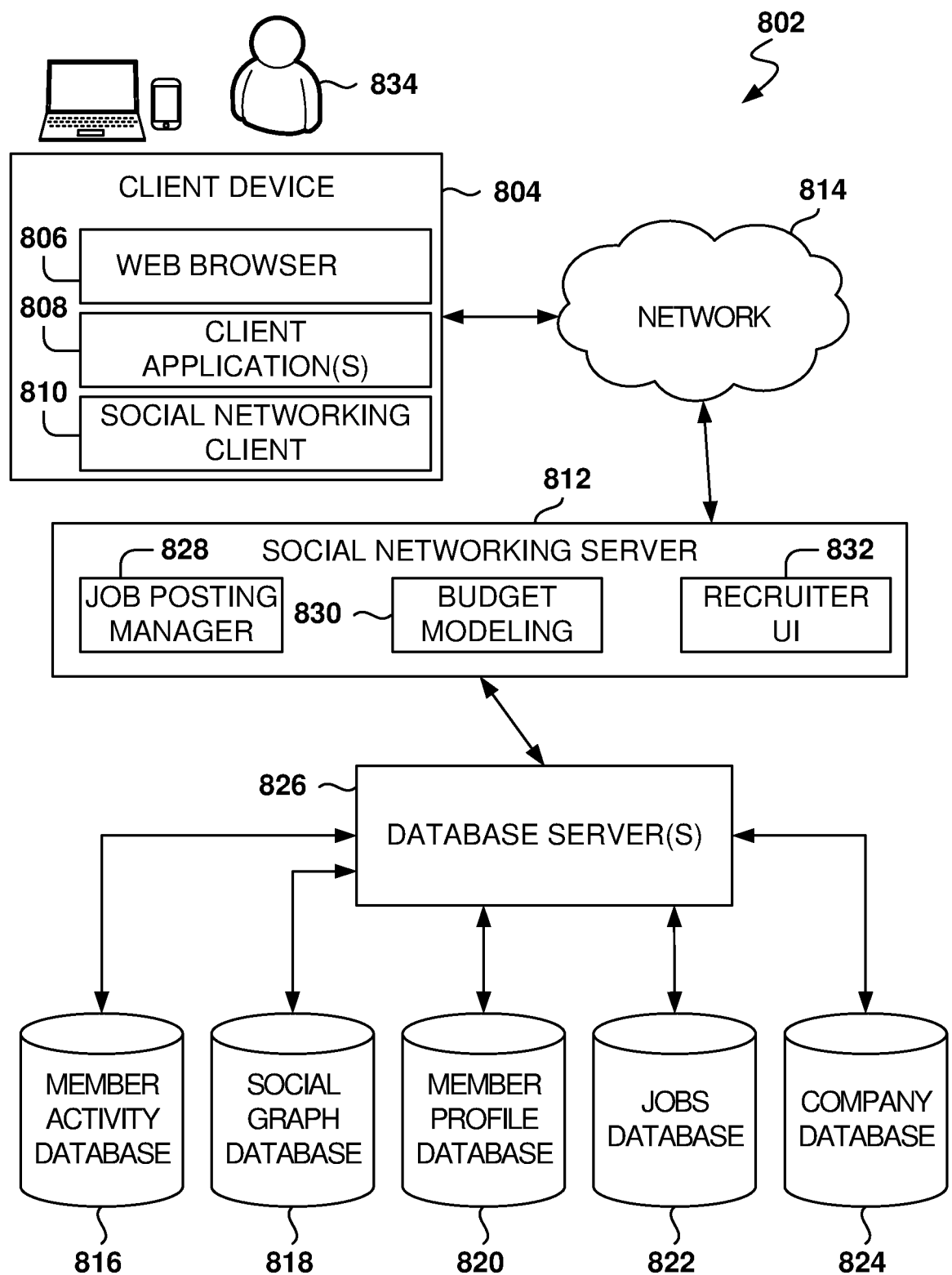
FIG. 8 is a block diagram illustrating an example embodiment of a high-level client-server-based network architecture, according to some example embodiments, including a social networking server.

FIG. 8 is a block diagram illustrating an example embodiment of a high-level client-server-based network architecture 802, according to some example embodiments, including a social networking server 812. The social networking server 812 provides server-side functionality via a network 814 (e.g., the Internet or a wide area network (WAN)) to one or more client devices 804. FIG. 8 illustrates, for example, a web browser 806, client application(s) 808, and a social networking client 810 executing on a client device 804. The social networking server 812 is further communicatively coupled with one or more database servers 826 that provide access to one or more databases 816-824.

The client device 804 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 834 may utilize to access the social networking server 812. In some embodiments, the client device 804 may comprise a display module (not shown) to display information (e.g., in the form of user interfaces). In further embodiments, the client device 804 may comprise one or more of touch screens, accelerometers, gyroscopes, cameras, microphones, Global Positioning System (GPS) devices, and so forth.

In one embodiment, the social networking server 812 is a network-based appliance that responds to initialization requests or search queries from the client device 804. One or more users 834 may be a person, a machine, or other means of interacting with the client device 804. In various embodiments, the user 834 is not part of the network architecture 802 but may interact with the network architecture 802 via the client device 804 or another means.

The client device 804 may include one or more applications (also referred to as "apps") such as, but not limited to, the web browser 806, the social networking client 810, and other client applications 808, such as a messaging application, an electronic mail (email) application, a news application, and the like. In some embodiments, if the social networking client 810 is present in the client device 804, then the social networking client 810 is configured to locally provide the user interface for the application and to communicate with the social networking server 812, on an as-needed basis, for data and/or processing capabilities not locally available (e.g., to access a member profile, to authenticate a user 834, to identify or locate other connected members, etc.). Conversely, if the social networking client 810 is not included in the client device 804, the client device 804 may use the web browser 806 to access the social networking server 812.

Further, while the client-server-based network architecture 802 is described with reference to a client-server architecture, the present subject matter is of course not limited to such an architecture, and could equally well find application in a distributed, or peer-to-peer, architecture system, for example.

In addition to the client device 804, the social networking server 812 communicates with the one or more database server(s) 826 and database(s) 816-824. In one example embodiment, the social networking server 812 is communicatively coupled to a member activity database 816, a social graph database 818, a member profile database 820, a jobs database 822, and a company database 824.

The member profile database 820 stores member profile information about members who have registered with the social networking server 812. With regard to the member profile database 820, the member may include an individual person or an organization, such as a company, a corporation, a nonprofit organization, an educational institution, or other such organizations.

Consistent with some example embodiments, when a user initially registers to become a member of the social networking service provided by the social networking server 812, the user is prompted to provide some personal information, such as name, age (e.g., birth date), gender, profile image, interests, contact information, home town, address, spouse's and/or family members' names, educational background (e.g., schools, majors, matriculation and/or graduation dates, etc.), employment history (e.g., companies worked at, periods of employment for the respective jobs, job titles), professional industry (also referred to herein simply as "industry"), skills, professional organizations, and so on. This information is stored, for example, in the member profile database 820. Similarly, when a representative of an organization initially registers the organization with the social networking service provided by the social networking server 812, the representative may be prompted to provide certain information about the organization, such as a company industry. This information may be stored, for example, in the member profile database 820.

In one example embodiments, the company database 824 stores information regarding companies in the member's profile. A company may also be a member; however, some companies may not be members of the social network even though some of the employees of the company may be members of the social network. The company database 824 includes company information, such as name, industry, contact information, website, address, location, geographic scope, and the like.

As users interact with the social networking service provided by the social networking server 812, the social networking server 812 is configured to monitor these interactions. Examples of interactions include, but are not limited to, commenting on posts entered by other members, viewing member profiles, editing or viewing a member's own profile, sharing content outside of the social networking service (e.g., an article provided by an entity other than the social networking server 812), updating a current status, posting content for other members to view and comment on, posting job suggestions for the members, searching job posts, and other such interactions. In one embodiment, records of these interactions are stored in the member activity database 816, which associates interactions made by a member with his or her member profile stored in the member profile database 820. In one example embodiment, the member activity database 816 includes the posts created by the users of the social networking service for presentation on user feeds.

The jobs database 822 includes job posts for jobs offered by companies in the company database 824. Each job post includes job-related information such as any combination of employer, job title, job description, requirements for the job, salary and benefits, geographic location, one or more job skills required, day the job was posted, relocation benefits, and the like.

In one embodiment, the social networking server 812 communicates with the various databases 816-824 through the one or more database server(s) 826. In this regard, the database server(s) 826 provide one or more interfaces and/or services for providing content to, modifying content in, removing content from, or otherwise interacting with the databases 816-824. For example, and without limitation, such interfaces and/or services may include one or more Application Programming Interfaces (APIs), one or more services provided via a Service-Oriented Architecture (SOA), one or more services provided via a Representational State Transfer (REST)—Resource Oriented Architecture (ROA), or combinations thereof.

While the database server(s) 826 are illustrated as a single block, one of ordinary skill in the art will recognize that the database server(s) 826 may include one or more such servers. Accordingly, and in one embodiment, the database server(s) 826 implemented by the social networking service are further configured to communicate with the social networking server 812.

Figure 1A:

In some example embodiments, the social networking server 812 includes, among other modules, a job-posting manager 828, a budget-modeling module 830, and a recruiter user interface 832. The job-posting manager 828 manages the interactions of job posters with the social network for managing job post-related activities, such as creating, modifying, monitoring, and terminating posts. The recruiter user interface 832 provides the interface for job posters, such as the user interface 102 illustrated in FIG. 1. The budget-modeling module 830 performs the activities for optimizing committed bookings, as described above. The modules may be implemented in hardware, software (e.g., programs), or a combination thereof.

Figure 9:
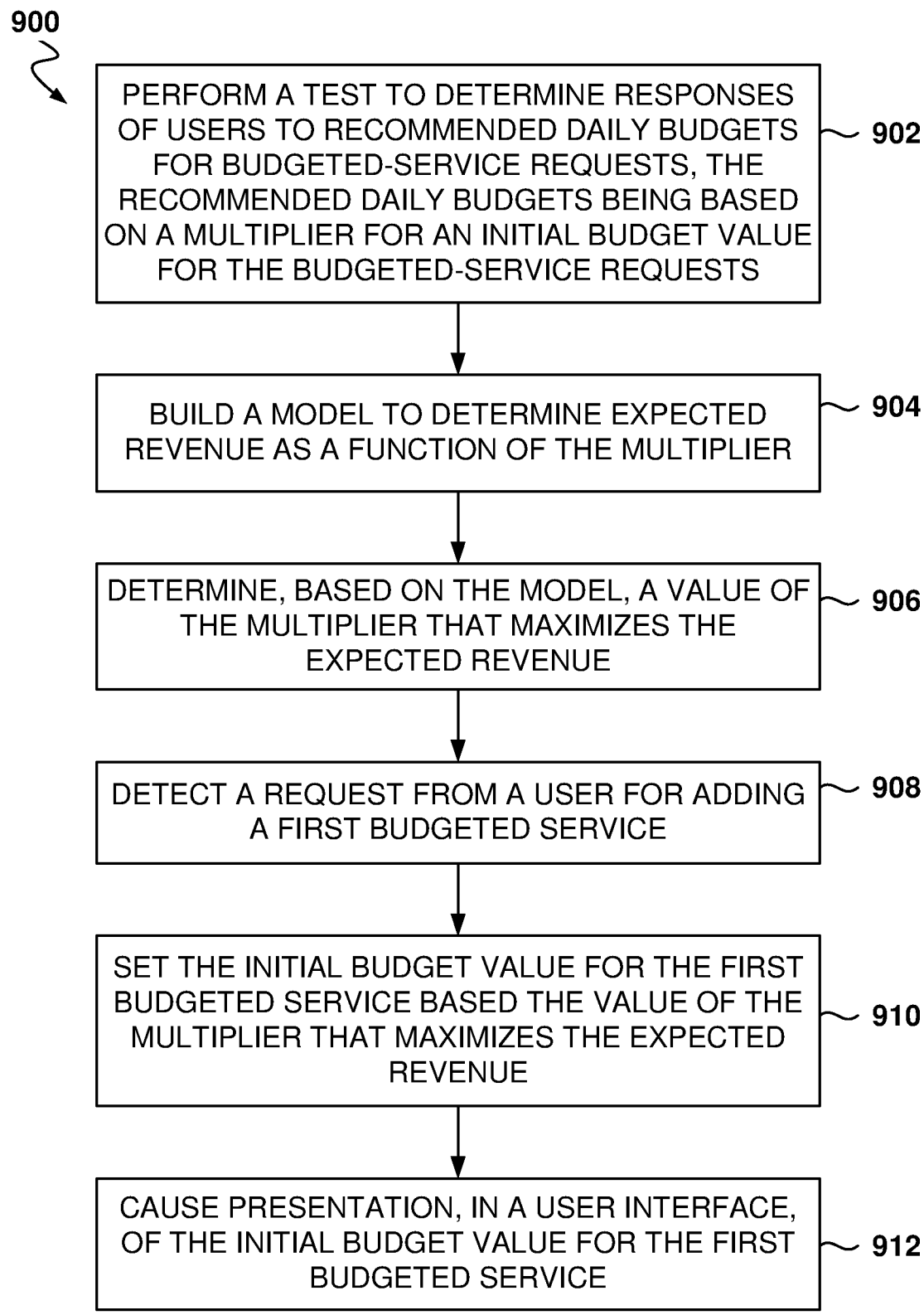
FIG. 9 is a flowchart of a method for determining a recommended daily budget for a budgeted-service requests, according to some example embodiments.

FIG. 9 is a flowchart of a method 900 for determining a recommended daily budget for budgeted-service requests, according to some example embodiments. While the various operations in this flowchart are presented and described sequentially, one of ordinary skill will appreciate that some or all of the operations may be executed in a different order, be combined or omitted, or be executed in parallel.

At operation 902, one or more processors perform a test to determine responses of users to recommended daily budgets for budgeted-service requests, the recommended daily budgets being based on a multiplier for an initial budget value for the budgeted-service requests.

From operation 902, the method 900 flows to operation 904, where the one or more processors build a model to determine expected revenue as a function of the multiplier.

From operation 904, the method 900 flows to operation 906 for determining, based on the model, a value of the multiplier that maximizes the expected revenue.

From operation 906, the method 900 flows to operation 908 where a request, from a user for adding a first budgeted service, is detected.

From operation 908, the method 900 flows to operation 910 for setting the initial budget value for the first budgeted service based the value of the multiplier that maximizes the expected revenue.

From operation 910, the method 900 flows to operation 912 for causing presentation, in a user interface, of the initial budget value for the first budgeted service.

In one example, building the model further includes defining a first model for determining a conversion rate as a function of the multiplier, where the conversion rate is a number of budgeted-service requests submitted divided by a number of budgeted-service requests started.

In one example, building the model further includes building a recommended-daily-budget model for determining the recommended daily budget as a function of the multiplier.

In one example, determining the value of the multiplier that maximizes the expected revenue further includes calculating the expected revenue as a function of the multiplier based on predictions for the conversion rate by the first model and predictions for the daily budget by the recommended-daily-budget model, and finding the value of the multiplier that maximizes the expected revenue based on the calculated expected revenue as a function of the multiplier.

In one example, the model is based on a plurality of machine-learning programs (MLPs) that are trained based on results from the test, where features for the MLPs include one or more of the multiplier, job post features, job-poster features, social-network-profile features, company features, and job-post response features.

In one example, performing the test further includes determining a range for values of the multiplier, and generating random values within the range of the multiplier during the test.

In one example, the expected revenue is calculated as a number of budgeted-service requests started by users times an average duration that the budgeted-service request is open times a conversion rate times the multiplier.

In one example, the method 900 further includes providing a user interface for presenting the recommended daily budget with an option to change the daily budget for the job post.

Figure 10:
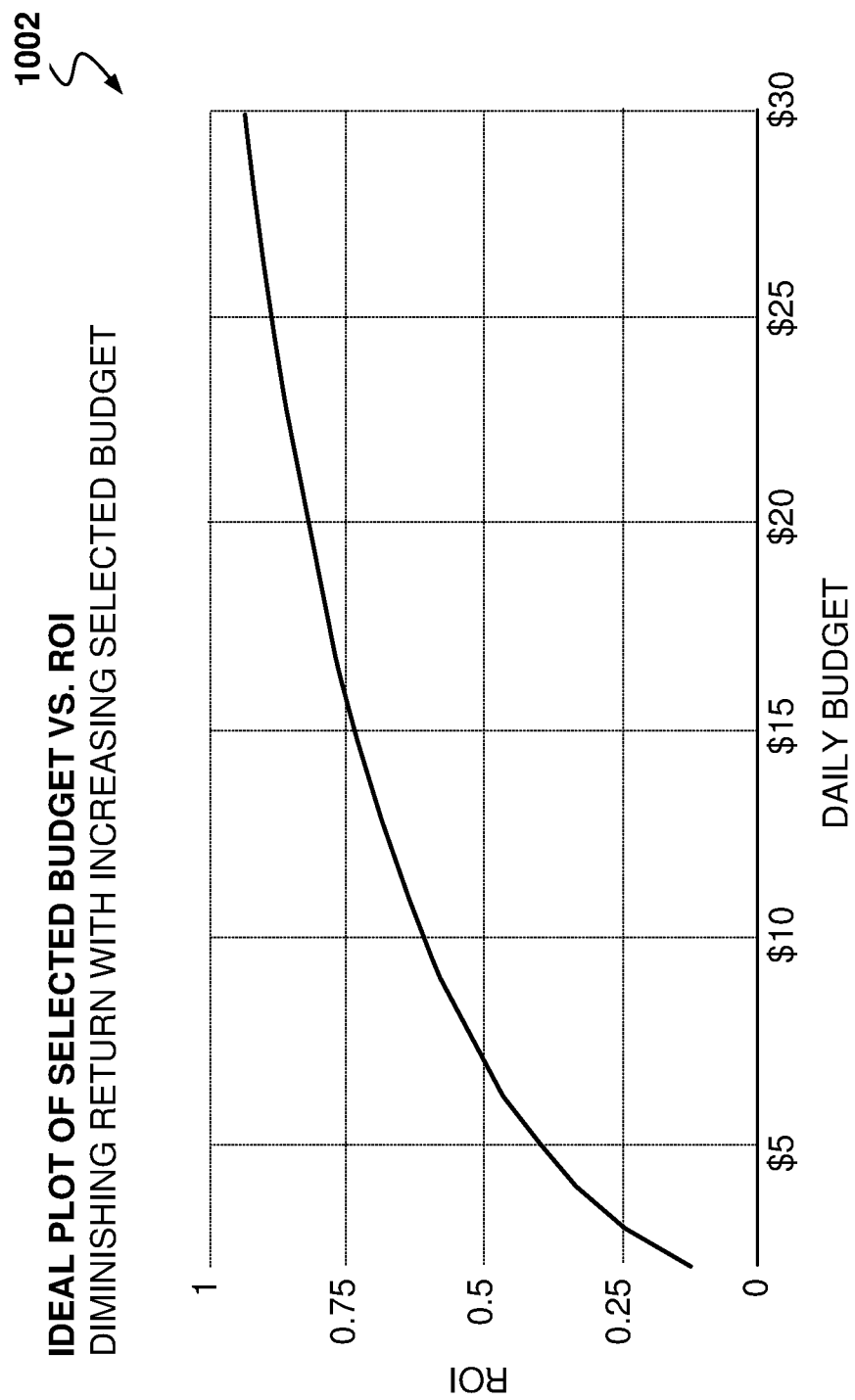
FIG. 10 is a chart showing typical return on investment (ROI) as a function of the daily budget, according to some example embodiments.

FIG. 10 is a chart 1002 showing typical return on investment (ROI) as a function of the daily budget, according to some example embodiments. Typically, as the daily budget increases, the return on investment increases, faster for lower budgets and with a lower rate of increase as the budget grows. When the budget grows big, the ROI tends to plateau at a constant maximum ROI.

However, this is a generic curve that applies to all job posts. A user is interested in finding out the ROI for jobs that are similar to the job post, because some job posts (e.g., executives) demand higher budgets than other jobs with lower salaries.

The user then would benefit from knowing the ROI on similar jobs. There are multiple ways of analyzing what are similar jobs, and there could be several possible criteria for classifying the information. For example, similarity may be measured for jobs that have the same title, the same skills, the same seniority levels, the same geography, the same industry, etc. In some example embodiments, one or more criteria may be combined for performing the similarity analysis (e.g., same title and the same industry).

In some example embodiments, the metric used for measuring ROI is confirmed hires: from all the similar jobs posted in the past (within a predetermined time period), how many job posts resulted in confirmed hires. For example, 1000 similar job posts were posted in the period between a year ago and six years ago, and 455 resulted in confirmed hires. It is noted that a certain amount of time (e.g., six months) is used after the job is posted to determine if the job post results in a confirmed hire.

Figure 11:
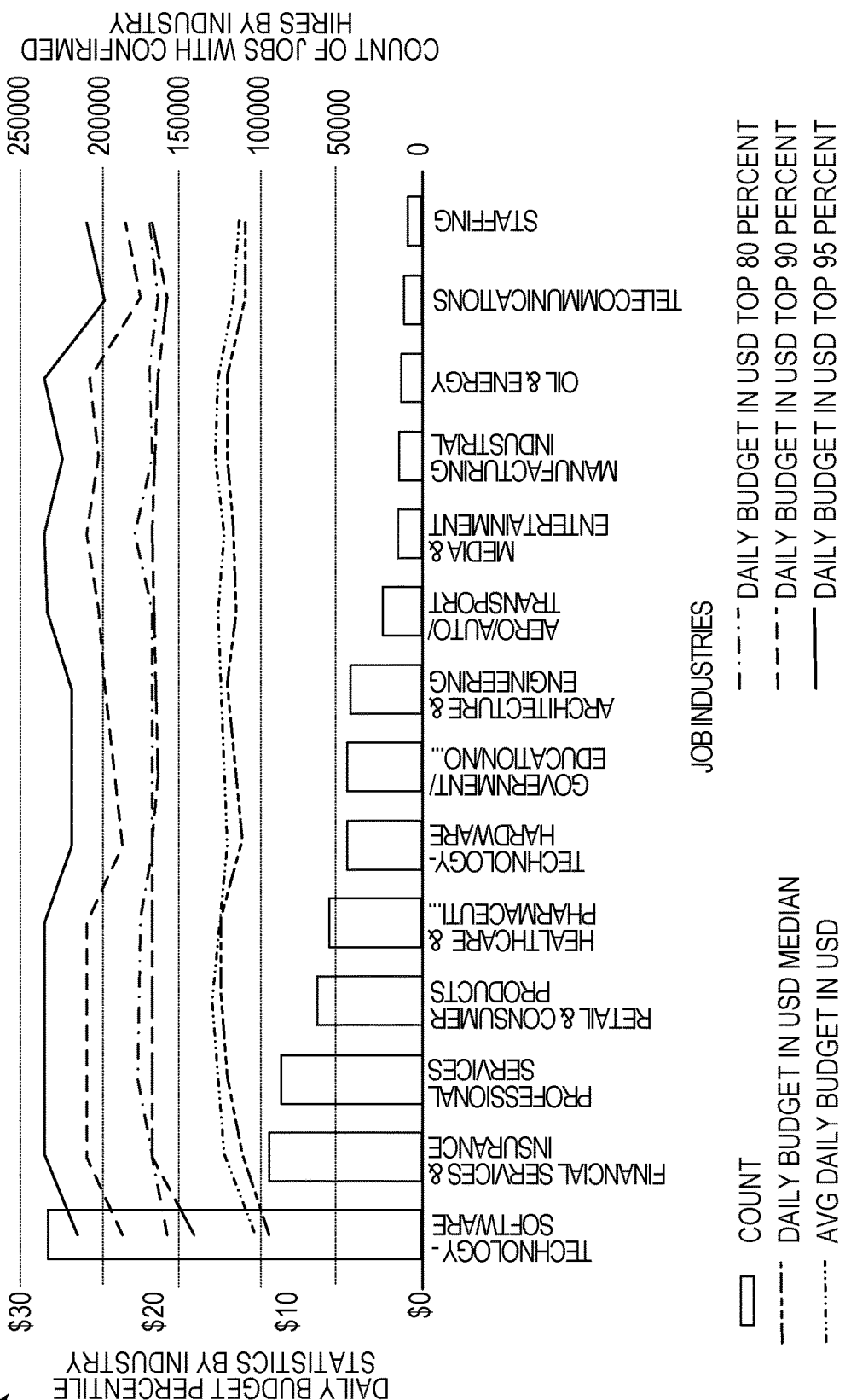
FIG. 11 is chart representing budgets for jobs with confirmed hires, according to some example embodiments.

FIG. 11 is chart 1102 representing budgets for jobs with confirmed hires, according to some example embodiments. Knowing the budgets for jobs with confirmed hires can be useful for a recruiter. One example would be to provide information, regarding jobs with confirmed hires (for a particular criterion), such as: if a certain percentile jobs with confirmed hires do not need to pay more than a certain budget (referred to as the "confirmed-hire budget"), then the job poster has a reasonable expectation of getting a confirmed hire if the job poster commits at least the confirmed-hire budget.

In another example, regarding jobs with confirmed hires (for a particular criterion), given a budget that the poster may select (potential budget), where would that potential budget belong in terms of percentiles of the confirmed-hire budget distribution, such as, "This $X budget you selected lies below Y % of jobs with confirmed hires in the same industry."

Chart 1102 shows information by industry (horizontal axis). The industries include Technology-Software, Financial Services and Insurance, Professional Services, Retail and Consumer Products, Healthcare and Pharmaceuticals, Technology-Hardware, etc.

A histogram shows a bar for each industry indicating the count of jobs (right vertical axis) in that industry. Further, different lines are shown, each line representing the average, the median, or a particular percentile of daily budgets (left vertical axis). For example, one line shows the average daily budget and another line shows the 80-percentile value.

It can be observed that lines for higher percentile values are higher on the chart 1102. If the system wants to present the 75-percentile value for "Technology-Hardware," then the data in the chart shows that the value of the daily budget is $20. The 90-percentile value is $23.

It is noted that the embodiments illustrated in FIG. 11 are examples and do not describe every possible embodiment. Other embodiments may utilize different criteria (e.g., skill, seniority, geography, expected salary). The embodiments illustrated in FIG. 11 should therefore not be interpreted to be exclusive or limiting, but rather illustrative.

Figure 12:
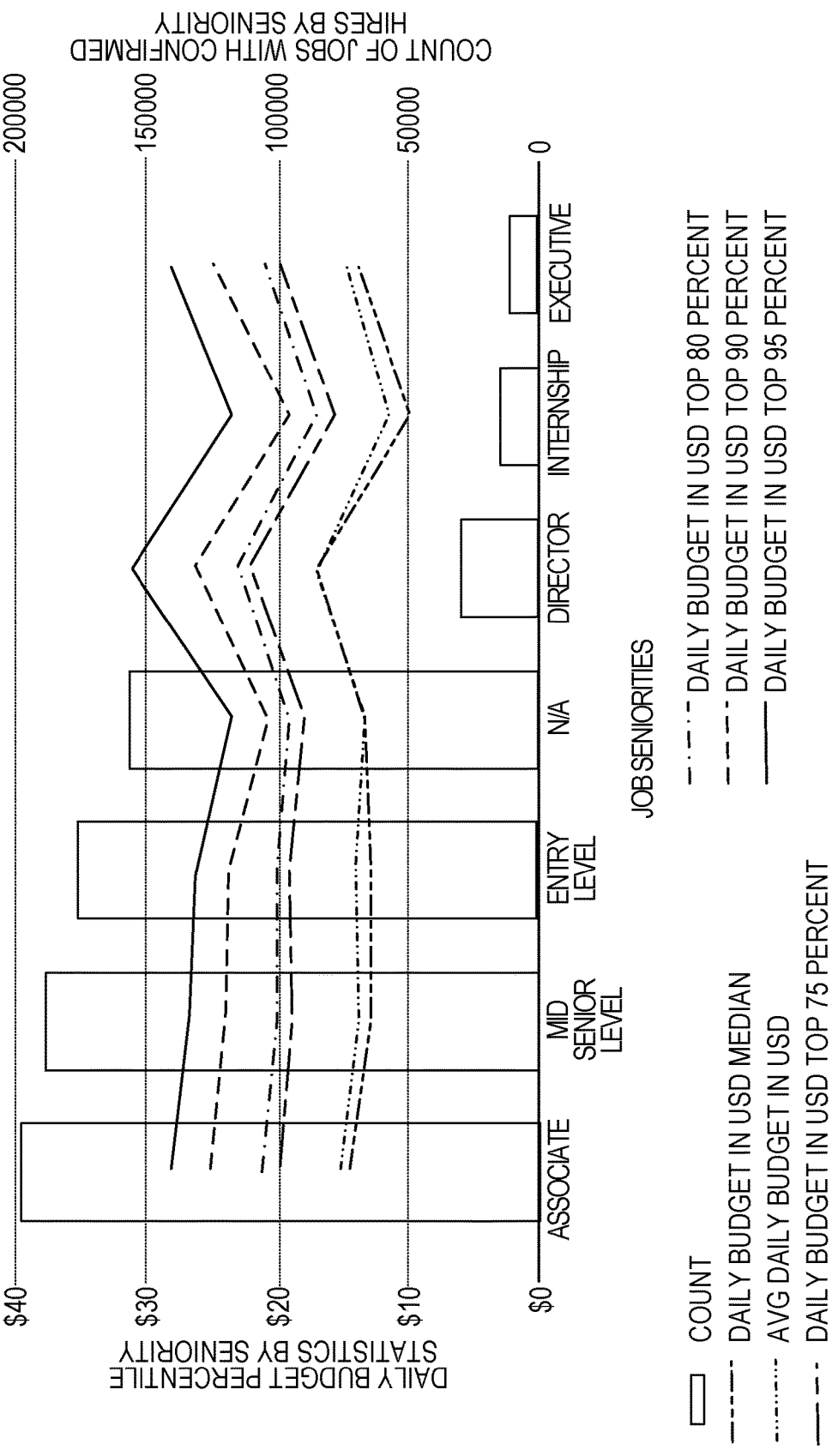
FIG. 12 is a chart representing budgets based on seniority, according to some example embodiments.

FIG. 12 is a chart 1202 representing budgets based on seniority, according to some example embodiments. The format of chart 1202 is the same as the format for the chart in FIG. 11 except that the selected criterion is job seniority. The category of job seniority includes associate, mid-senior level, entry level, not applicable (NA) (for jobs with unknown seniority level), director, intern, and executive. For example, the median daily budget for directors is $18, and the 80 percentile daily budget for associates is $16.

It is noted that this chart is for seniorities across all industries. In some example embodiments, two types of criteria are combined to provide the statistical values, e.g., industry and seniority. The information provided then may be, "the 80-percentile daily budget value for associates in professional services is $23." Furthermore, more than two criteria may be combined, such as in the range from 2 to 20.

The system may select different percentile values for presenting the information. For example, the system may select the percentile value that would be closer to the daily budget selected by the job poster. For example, if the job poster sets a daily budget of 22, it is more relevant to the job poster to say "80 percent of jobs with confirmed hires used a daily budget of 23 or more," than "the average daily budget for jobs with confirmed hires is 18," because the first message provides more relevant information based on the user's selected daily budget. In some example embodiments, more than one statistical value may be provided, such as showing the two messages.

Figure 13:
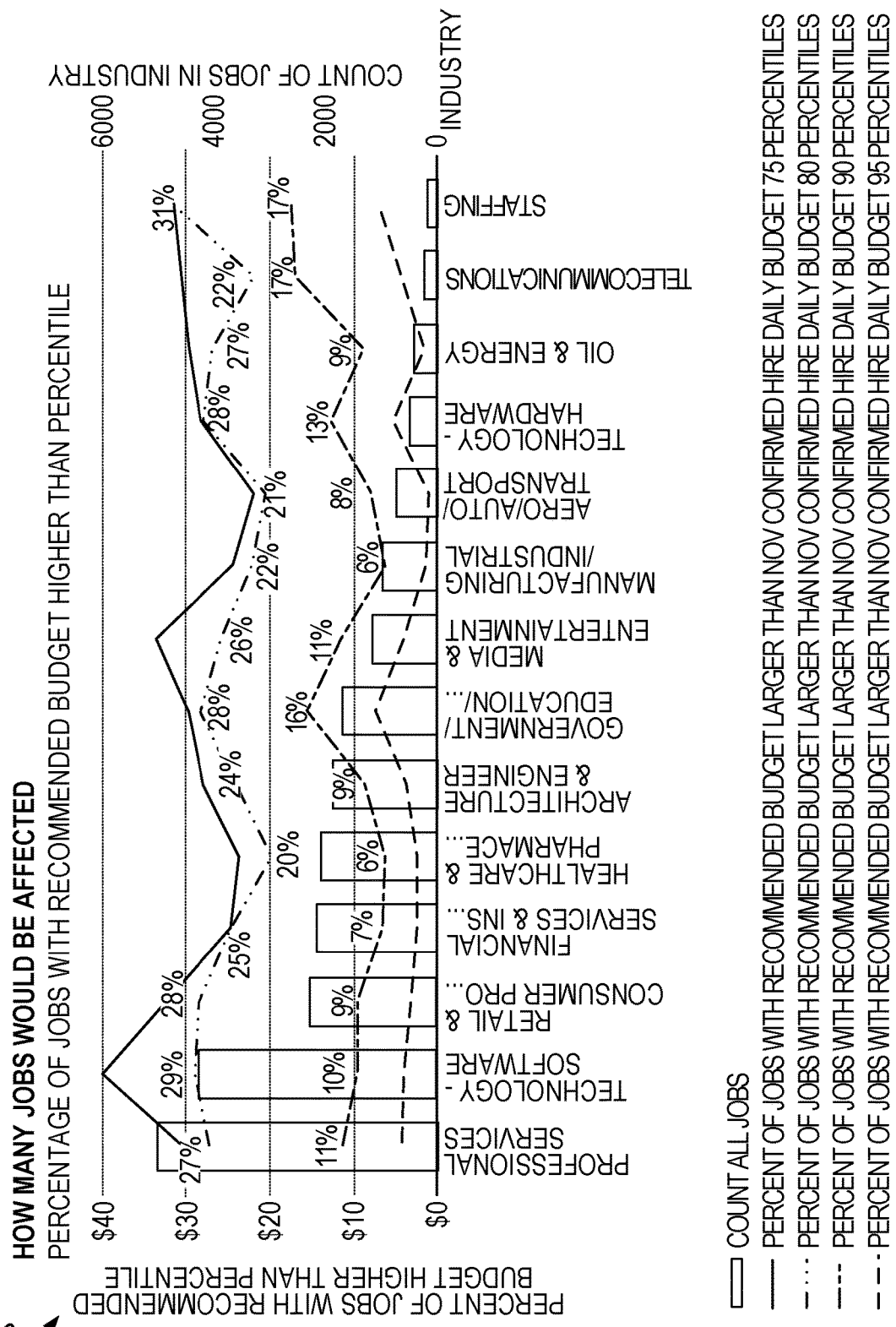
FIG. 13 is a chart showing the impact on the recommended budget, according to some example embodiments.

FIG. 13 is a chart 1302 showing the impact on the recommended budget, according to some example embodiments. It is useful for the budget-recommendation system to know what is the number of jobs that may be affected by a given percentile number.

Chart 1302 shows the industries on the horizontal axis, the count axis for the histogram on the right, and the percentage of jobs with recommended budgets higher than the percentile. The lines on the chart correspond to different percentile values, in this case, 75, 80, 90, and 95 percentiles, but other charts may include additional or fewer percentiles lines. Additionally, the values for the 80 and 90 percentiles have been posted on the histogram bars.

In some example embodiments, the different percentiles are analyzed and then it is calculated how many current job posts were recommended a budget higher than the value for a given percentile. For example, if 70 percentile is used as a cutoff to calculate "how many jobs were posted above 70 percentile", then the system identifies how many jobs have a daily budget above this value. For these identified jobs, the poster may decide that the budget is too high and lower the daily budget.

For example, the system may identify that for Professional Services, the 75 percentile has a value of 4%, which means that 4% of job posts in Professional Services have a daily budget above the 75 percentile, which is about $20 as seen in FIG. 11.

Knowing which jobs would be impacted by presenting different types of information enables the social networking service to determine the best way to present the information to the users, not only to make the information valuable to the users, but also to decide how the information can impact the daily budgets, and potentially the revenue that is based on those daily budgets.

Figure 14:
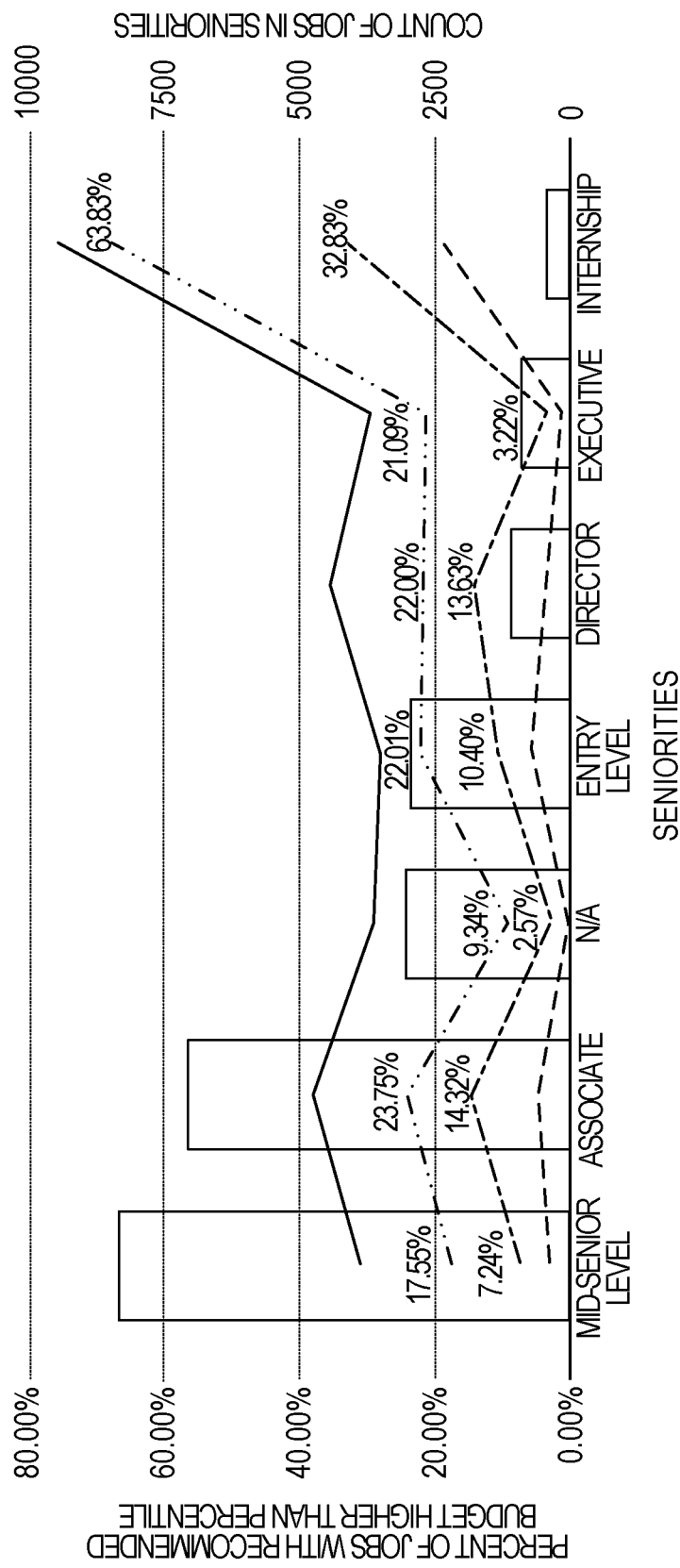
FIG. 14 is a chart showing the impact on the recommended budget by seniority, according to some example embodiments.

FIG. 14 is a chart 1402 showing the impact on the recommended budget by seniority, according to some example embodiments. The chart 1402 has the same format as the chart in FIG. 13, except that the criterion selected in the horizontal axis is seniority instead of industry.

One way to mitigate the risk that a job poster reduces the daily budget is by selecting higher percentile values. This way, the selected budget will not likely be above the statistical value given for the confirmed-hired budget.

Figure 15:
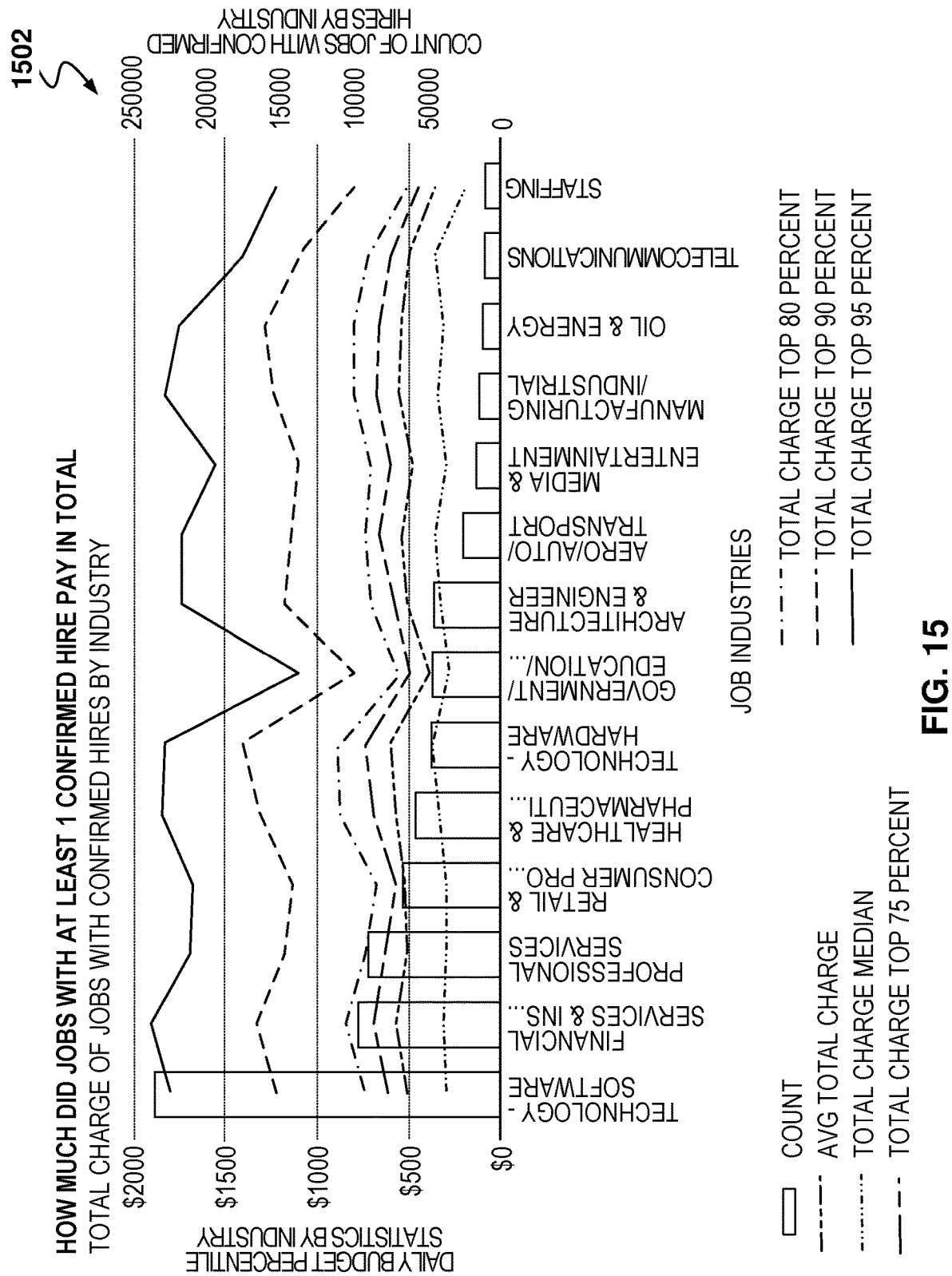
FIG. 15 is a chart showing expenditures for jobs with confirmed hires, according to some example embodiments.

FIG. 15 is a chart 1502 showing total expenditures for jobs with confirmed hires, according to some example embodiments. Chart 1502 shows information by industry (horizontal axis), with the histogram showing bars for each industry indicating the count of jobs (right vertical axis) in that industry. Further, different lines are shown, each line representing the average, the median, or a particular percentile of the total amount spent (left vertical axis) on the social network service for the jobs with confirmed hires. For example, one line shows the average total expense budget and another line shows the 80-percentile total expense value.

The message for the job poster may then be, "The total expense for the lifetimes of job posts in the same industry is $1100 for 80% of the jobs with confirmed hires in the same industry."

Providing information on the total expense for similar jobs assists the job poster in determining the daily budget based on the expected amount of time the job will be posted, that is, use lifetime pacing for the job post. For example, if the total budget is $2500 and the job post is expected to be presented for 100 days, the daily budget would be $25 to be able to meet the overall budget expense.

Another benefit of lifetime pacing is that the poster can shift more budget towards the beginning of the lifetime, since most job posters tend to spend more money at the beginning than at the end of the lifetime. Over-delivery occurs when a job-post uncapped cost is higher than the actual charge, which is capped at a certain value above 100% (e.g., 120%). However, over-delivery does not usually happen for specific jobs every day; rather, it happens for many jobs for only a few days (mostly the first several days of post). If the expenditure from the total expense budget is shifted towards the beginning of the jobs post (avoiding holidays), this would mean higher potential revenue under the current auction mechanism because the over-delivery is reduced.

Figure 16:
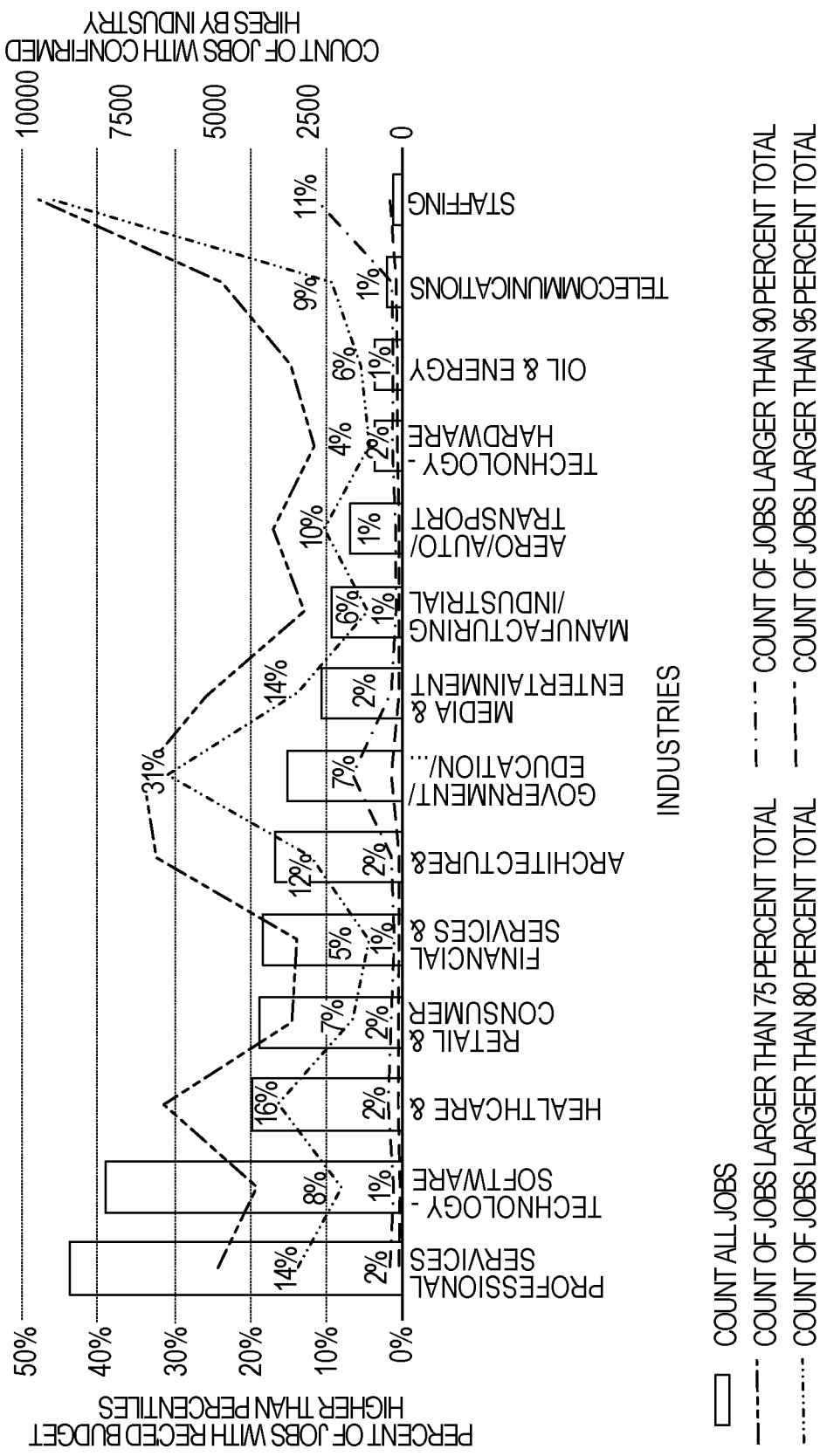
FIG. 16 is a chart illustrating the impact on the recommended budget, according to some example embodiments.

FIG. 16 is a chart 1602 illustrating the impact on the recommended budget, according to some example embodiments. The chart 1602 shows how many job posts would be affected when the recommended budget is lower than a certain percentile for the total expense.

Chart 1602 is similar to the chart in FIG. 13, except that the numbers are for the total expense instead of the daily budget. Chart 1602 shows the industries on the horizontal axis, the count axis for the histogram on the right, and the percentage of jobs with recommended total budgets (e.g., total expenses) higher than the percentile. The lines on the chart correspond to different percentile values, in this case, 75, 80, 90, and 95 percentiles, but other charts may include additional or fewer percentiles lines. Additionally, the values for the 80 and 90 percentiles have been posted on the histogram bars.

In some example embodiments, the different percentiles are analyzed and then it is calculated how many current job posts have a total budget higher than the value for a given percentile. For example, if 70 percentile is used as a cutoff to calculate "how many jobs were posted above 70 percentile", then the system identifies how many jobs have a total expense above this value. For these identified jobs, the poster may decide that the total budget is too high and lower the total budget.

Figure 17:
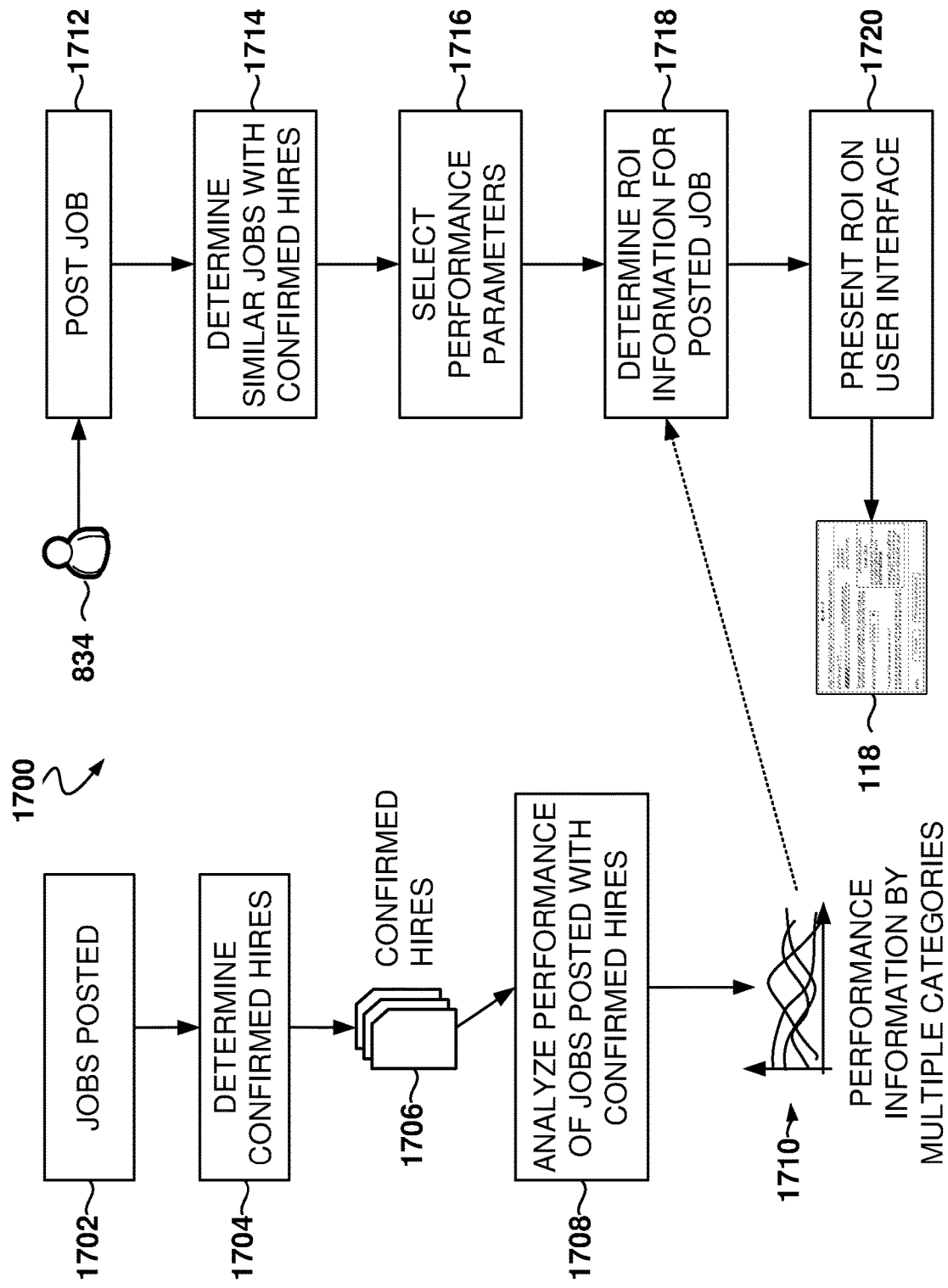
FIG. 17 is a flowchart showing how to calculate the ROI, according to some example embodiments.

FIG. 17 is a flowchart of a method 1700 showing how to calculate the ROI, according to some example embodiments. While the various operations in this flowchart are presented and described sequentially, one of ordinary skill will appreciate that some or all of the operations may be executed in a different order, be combined or omitted, or be executed in parallel.

Over time, job posts are posted 1702 and a determination is made, at operation 1704, of which of the jobs posted 1702 resulted in confirmed hires 1706. In some example embodiments, a predetermined amount of time is used to determine if a job post resulted in a confirmed hire 1706 (e.g., six months after the job was initially posted).

At operation 1708, the performance of the jobs posted 1702 with confirmed hires is analyzed to determine the statistical data, such as the data associated with FIGS. 10-16, with performance information by multiple categories 1710. The statistical data is based on the daily budgets for the confirmed-hires jobs over the lifetime of the job post, and also includes the total expenditures.

The statistical values include any statistical value, such as averages, medians, percentiles, standard deviations, etc. The resulting data is stored in a database for use when a user 834 is entering the daily budget.

At operation 1712, the user 834 posts a job using a user interface such as the ones illustrated in FIGS. 1A and 1B. At operation 1714, a determination is made of the job posts with confirmed hires that are similar to the posted job.

From operation 1714, the method 1700 flows to operation 1716 where performance parameters are selected for presenting ROI information to the user 834. For example, the performance parameters may include a percentile value for determining the daily budgets of the similar jobs.

At operation 1718, the ROI information for the posted job is determined, and at operation 1720 the information is presented in a user interface, such as user interface 118 of FIG. 1B. For example, the ROI information is presented in box 116 of FIG. 1B, e.g., "Job posts like yours—The typical daily budget for similar jobs that got confirmed hires is: $20-$25. Among jobs with confirmed hires, 50% posted their budget within or above this range."

Figure 18:
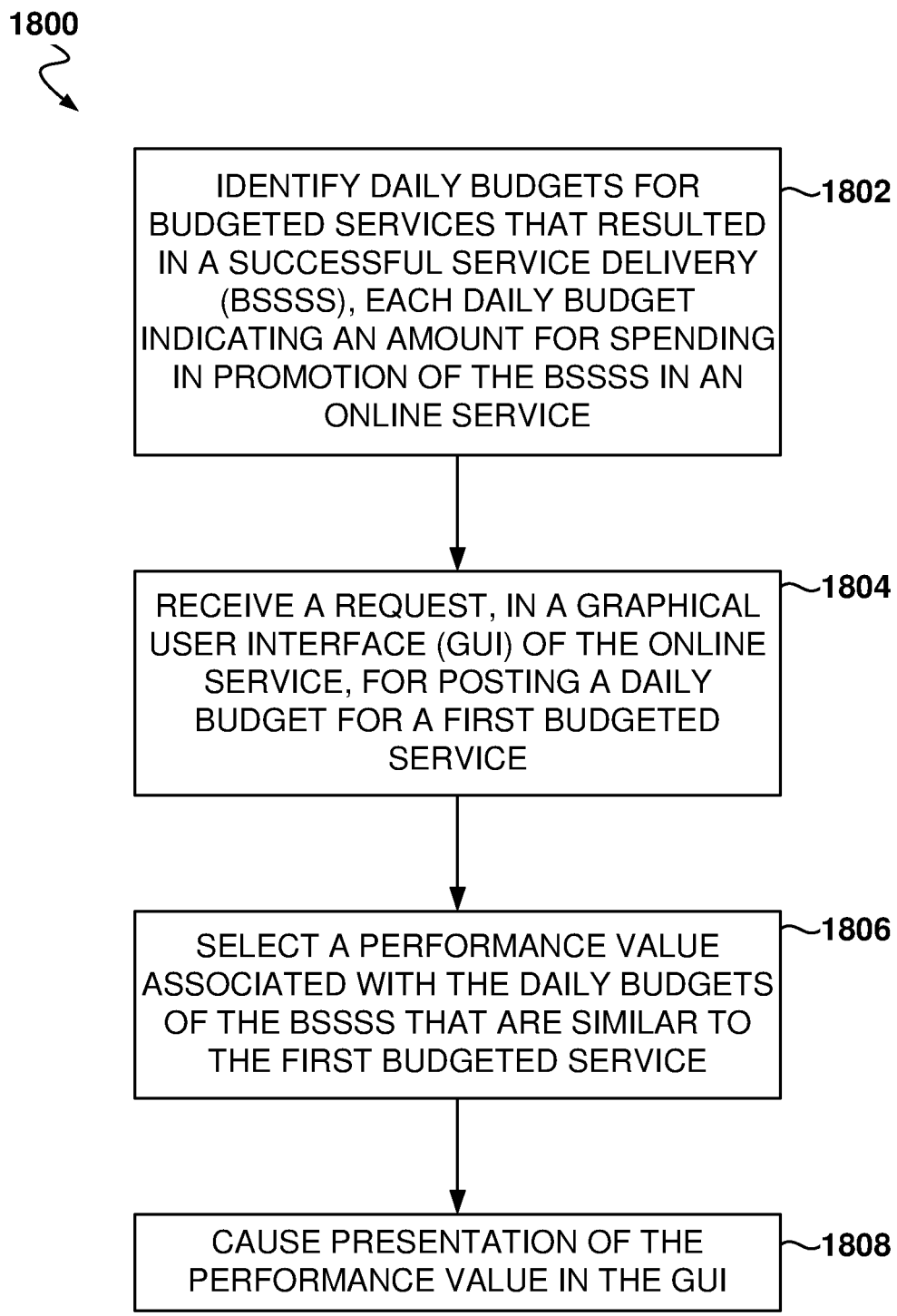
FIG. 18 is a flowchart of a method for presenting return-on-investment (ROI) information, for budgeted services that resulted in a successful service delivery, on a user interface for setting the budget for a service request, according to some example embodiments.

FIG. 18 is a flowchart of a method 1800 for presenting return-on-investment (ROI) information, for budgeted services that resulted in a successful service delivery, on a user interface for setting the budget for a service request, according to some example embodiments. While the various operations in this flowchart are presented and described sequentially, one of ordinary skill will appreciate that some or all of the operations may be executed in a different order, be combined or omitted, or be executed in parallel.

At operation 1802, one or more processors identify daily budgets for budgeted services that resulted in a successful service delivery (BSSSD), each daily budget indicating an amount for spending in promotion of the BSSSD in an online service. Each daily budget indicates an amount for spending in promotion of the BSSSD in the online service. Examples of budgeted services include placing job posts on an online service, placing content on a user feed, promoting a website when displaying search results, and placing advertisements online. The corresponding BSSSD for these services include job posts that resulted in confirmed hires, number of placements above a predetermined threshold in a user feed, number of clicks above a predetermined threshold in response to placement of content, number of visitors to a website above a predetermined threshold in response to online promotions, number of placed advertisements above a predetermined threshold, etc.

From operation 1802, the method 1800 flows to operation 1804 for receiving a request, in a graphical user interface (GUI) of the online service, for posting a daily budget for a first budgeted service.

From operation 1804, the method 1800 flows to operation 1806 where the one or more processors select a performance value associated with the daily budgets the BSSSD that are similar to the first budgeted service.

From operation 1806, the method 1800 flows to operation 1808 for causing presentation, by the one or more processors, of the performance value in the GUI.

In one example, the method 1800 further includes calculating one or more statistical values of the BSSSD, the statistical values based in one or more criteria associated with the BSSSD.

In one example, the performance value is selected from a group consisting of average of the BSSSD daily budgets, median of the BSSSD daily budgets, and percentile value of the BSSSD daily budgets.

In one example, the budgeted service is presenting job posts, wherein BSSSD is job posts that resulted in confirmed hires (JPCH).

In one example, the criterion for determining BSSSD that are similar to the first budgeted service is selected from a group consisting of industry, job seniority, and job title.

In one example, the budgeted service is for promoting results from an online search, wherein BSSSD is a number of promotions when presenting the results from online searches.

In one example, the budgeted service is placing advertisements online, wherein BSSSD is a clickthrough rate for the placed advertisements.

In one example, presenting the performance value includes indicating a daily budget for a first percentile of the BSSSD that are similar to the first budgeted service.

Another general aspect is for a system that includes a memory comprising instructions and one or more computer processors. The instructions, when executed by the one or more computer processors, cause the one or more computer processors to perform operations comprising: identifying daily budgets for budgeted services that resulted in a successful service delivery (BSSSD), each daily budget indicating an amount for spending in promotion of the BSSSD in an online service; receiving a request, in a graphical user interface (GUI) of the online service, for posting a daily budget for a first budgeted service; selecting a performance value associated with the daily budgets of the BSSSD that are similar to the first budgeted service; and causing presentation of the performance value in the GUI.

In yet another general aspect, a machine-readable storage medium (e.g., a non-transitory storage medium) includes instructions that, when executed by a machine, cause the machine to perform operations comprising: identifying daily budgets for budgeted services that resulted in a successful service delivery (BSSSD), each daily budget indicating an amount for spending in promotion of the BSSSD in an online service; receiving a request, in a graphical user interface (GUI) of the online service, for posting a daily budget for a first budgeted service; selecting a performance value associated with the daily budgets of the BSSSD that are similar to the first budgeted service; and causing presentation of the performance value in the GUI.

Figure 19:
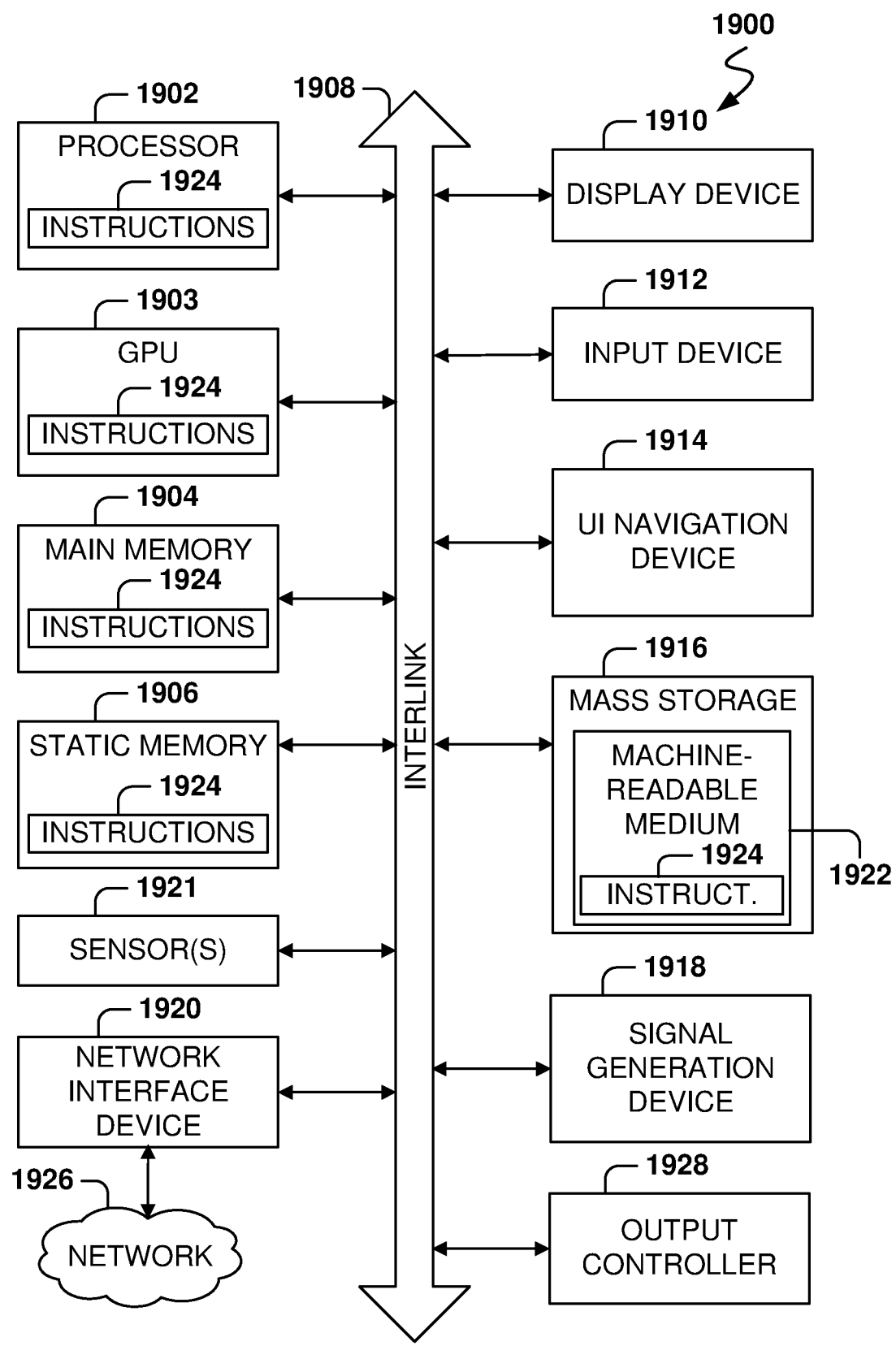
FIG. 19 is a block diagram illustrating an example of a machine upon or by which one or more example process embodiments described herein may be implemented or controlled.

FIG. 19 is a block diagram illustrating an example of a machine 1900 upon or by which one or more example process embodiments described herein may be implemented or controlled. In alternative embodiments, the machine 1900 may operate as a standalone device or may be connected (e.g., networked) to other machines. In a networked deployment, the machine 1900 may operate in the capacity of a server machine, a client machine, or both in server-client network environments. In an example, the machine 1900 may act as a peer machine in a peer-to-peer (P2P) (or other distributed) network environment. Further, while only a single machine 1900 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1900 may include a hardware processor 1902 (e.g., a central processing unit (CPU), a hardware processor core, or any combination thereof), a graphics processing unit (GPU) 1903, a main memory 1904, and a static memory 1906, some or all of which may communicate with each other via an interlink (e.g., bus) 1908. The machine 1900 may further include a display device 1910, an alphanumeric input device 1912 (e.g., a keyboard), and a user interface (UI) navigation device 1914 (e.g., a mouse). In an example, the display device 1910, alphanumeric input device 1912, and UI navigation device 1914 may be a touch screen display. The machine 1900 may additionally include a mass storage device (e.g., drive unit) 1916, a signal generation device 1918 (e.g., a speaker), a network interface device 1920, and one or more sensors 1921, such as a Global Positioning System (GPS) sensor, compass, accelerometer, or another sensor. The machine 1900 may include an output controller 1928, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 1916 may include a machine-readable medium 1922 on which is stored one or more sets of data structures or instructions 1924 (e.g., software) embodying or utilized by any one or more of the techniques or functions described herein. The instructions 1924 may also reside, completely or at least partially, within the main memory 1904, within the static memory 1906, within the hardware processor 1902, or within the GPU 1903 during execution thereof by the machine 1900. In an example, one or any combination of the hardware processor 1902, the GPU 1903, the main memory 1904, the static memory 1906, or the mass storage device 1916 may constitute machine-readable media.

While the machine-readable medium 1922 is illustrated as a single medium, the term "machine-readable medium" may include a single medium or multiple media (e.g., a centralized or distributed database, and/or associated caches and servers) configured to store the one or more instructions 1924.

The term "machine-readable medium" may include any medium that is capable of storing, encoding, or carrying instructions 1924 for execution by the machine 1900 and that cause the machine 1900 to perform any one or more of the techniques of the present disclosure, or that is capable of storing, encoding, or carrying data structures used by or associated with such instructions 1924. Non-limiting machine-readable medium examples may include solid-state memories, and optical and magnetic media. In an example, a massed machine-readable medium comprises a machine-readable medium 1922 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Erasable Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1924 may further be transmitted or received over a communications network 1926 using a transmission medium via the network interface device 1920.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    performing, by one or more processors, an experiment to determine responses of users to recommended daily budgets for budgeted-service requests, each recommended daily budget being associated with a value of a multiplier selected from a range of values, each recommended daily budget being equal to the value of the multiplier times a predefined initial budget value, each response being one of accepting the recommended daily budget, entering a daily budget different from the recommended daily budget, or not setting the daily budget;
    building, by the one or more processors, a machine-learning (ML) model using training data to determine an expected revenue for a budgeted service request, the training data comprising values for the multiplier, job post, and job responses, the ML model using the value of the multiplier as an input to determine the expected revenue;
    determining, by the ML model, the expected revenue for the budgeted-service request for each recommended daily budget based on the value of the multiplier used for the recommended daily budget;
    determining which value of the multiplier from the range of values maximizes the expected revenue for the budgeted-service request;
    detecting a request from a user for adding a first budgeted-service request;
    setting an initial budget value for the first budgeted-service request equal to the value of the multiplier that maximizes the expected revenue times the predefined initial budget value; and
    causing presentation, in a user interface, of the initial budget value for the first budgeted-service request.

2. The method as recited in claim 1, wherein building the ML model further includes:
    building a first ML model for determining a conversion rate as a function of the value of the multiplier, wherein the conversion rate is a number of budgeted-service requests submitted divided by a number of budgeted-service requests started.

3. The method as recited in claim 2, wherein building the ML model further includes:
    building a second ML model for determining a recommended daily budget as a function of the value of the multiplier.

4. The method as recited in claim 3, wherein determining the value of the multiplier that maximizes the expected revenue further includes:
    calculating the expected revenue as a function of the multiplier based on predictions for the conversion rate by the first ML model and predictions for the recommended daily budget by the second ML model; and
    finding the value of the multiplier that maximizes the expected revenue based on the calculated expected revenue.

5. The method as recited in claim 1, wherein the ML model is based on a plurality of machine-learning programs (MLPs) that are trained based on results from the experiment.

6. The method as recited in claim 1, wherein the first budgeted-service request is for requesting a job post.

7. The method as recited in claim 6, wherein features for the MLPs include one or more of the multiplier, job-post features, job-poster features, social-network-profile features, company features, or job-post response features.

8. The method as recited in claim 1, wherein performing the experiment further includes:
    determining the range of values for the multiplier; and
    determining each recommended daily budget by generating a random value within the range of values and setting the recommended daily budget as the randomly generated value times the predefined initial budget value.

9. The method as recited in claim 1, wherein the expected revenue is calculated as a number of budgeted-service requests started by users times an average duration that the budgeted-service request is open times a conversion rate times the multiplier.

10. A system comprising:
a memory comprising instructions; and
one or more computer processors, wherein the instructions, when executed by the one or more computer processors, cause the system to perform operations comprising:
performing an experiment to determine responses of users to recommended daily budgets for budgeted-service requests, each recommended daily budget being associated with a value of a multiplier selected from a range of values, each recommended daily budget being equal to the value of the multiplier times a predefined initial budget value, each response being one of accepting the recommended daily budget, entering a daily budget different from the recommended daily budget, or not setting the daily budget;
building a machine-learning (ML) model using training data to determine an expected revenue for a budgeted service request, the training data comprising values for the multiplier, job post, and job responses, the ML model using the value of the multiplier as an input to determine the expected revenue;
determining, by the ML model, the expected revenue for the budgeted-service request for each recommended daily budget based on the value of the multiplier used for the recommended daily budget;
determining which value of the multiplier from the range of values maximizes the expected revenue for the budgeted-service request;
detecting a request from a user for adding a first budgeted-service request;
setting an initial budget value for the first budgeted-service request equal to the value of the multiplier that maximizes the expected revenue times the predefined initial budget value; and
causing presentation, in a user interface, of the initial budget value for the first budgeted-service request.

11. The system as recited in claim 10, wherein building the ML model further includes:
building a first ML model for determining a conversion rate as a function of the value of the multiplier, wherein the conversion rate is a number of budgeted-service requests submitted divided by a number of budgeted-service requests started.

12. The system as recited in claim 11, wherein building the ML model further includes:
building a second ML model for determining a recommended daily budget as a function of the value of the multiplier.

13. The system as recited in claim 12, wherein determining the value of the multiplier that maximizes the expected revenue further includes:
calculating the expected revenue as a function of the multiplier based on predictions for the conversion rate by the first ML model and predictions for the recommended daily budget by the second ML model; and
finding the value of the multiplier that maximizes the expected revenue based on the calculated expected revenue.

14. The system as recited in claim 10, wherein the first budgeted-service request is for requesting a job post.

15. The system as recited in claim 10, wherein features for the MLPs include one or more of the multiplier, job-post features, job-poster features, social-network-profile features, company features, or job-post response features.

16. The system as recited in claim 10, wherein performing the experiment further includes:
determining the range of values for the multiplier; and
determining each recommended daily budget by generating a random value within the range of values and setting the recommended daily budget as the randomly generated value times the predefined initial budget value.

17. The system as recited in claim 10, wherein the expected revenue is calculated as a number of budgeted-service requests started by users times an average duration that the budgeted-service request is open times a conversion rate times the multiplier.

18. A tangible machine-readable storage medium including instructions that, when executed by a machine, cause the machine to perform operations comprising:
performing, by one or more processors, an experiment to determine responses of users to recommended daily budgets for budgeted-service requests, each recommended daily budget being associated with a value of a multiplier selected from a range of values, each recommended daily budget being equal to the value of the multiplier times a predefined initial budget value, each response being one of accepting the recommended daily budget, entering a daily budget different from the recommended daily budget, or not setting the daily budget;
building, by the one or more processors, a machine-learning (ML) model using training data to determine an expected revenue for a budgeted service request, the training data comprising values for the multiplier, job post, and job responses, the ML model using the value of the multiplier as an input to determine the expected revenue;
determining, by the ML model, the expected revenue for the budgeted-service request for each recommended daily budget based on the value of the multiplier used for the recommended daily budget;
determining which value of the multiplier from the range of values maximizes the expected revenue for the budgeted-service request;
detecting a request from a user for adding a first budgeted-service request;
setting an initial budget value for the first budgeted-service request equal to the value of the multiplier that maximizes the expected revenue times the predefined initial budget value; and
causing presentation, in a user interface, of the initial budget value for the first budgeted-service request.

19. The tangible machine-readable storage medium as recited in claim 18, wherein building the ML model further includes:
building a first ML model for determining a conversion rate as a function of the value of the multiplier, wherein the conversion rate is a number of budgeted-service requests submitted divided by a number of budgeted-service requests started; and building a second ML model for determining a recommended daily budget as a function of the value of the multiplier.

20. The tangible machine-readable storage medium as recited in claim 19, wherein determining the value of the multiplier that maximizes the expected revenue further includes:
- calculating the expected revenue as a function of the multiplier based on predictions for the conversion rate by the first ML model and predictions for the recommended daily budget by the second ML model; and
- finding the value of the multiplier that maximizes the expected revenue based on the calculated expected revenue.

\* \* \* \* \*